United States Patent
Yamamoto

[11] Patent Number: 5,991,094
[45] Date of Patent: *Nov. 23, 1999

[54] ZOOM LENS SYSTEM FOR A LENS SHUTTER CAMERA

[75] Inventor: Yasushi Yamamoto, Kishiwada, Japan

[73] Assignee: Minolta Co., Ltd., Osaka, Japan

[*] Notice: This patent is subject to a terminal disclaimer.

[21] Appl. No.: 09/103,857

[22] Filed: Jun. 24, 1998

Related U.S. Application Data

[62] Division of application No. 08/712,257, Sep. 11, 1996, Pat. No. 5,815,324.

[30] Foreign Application Priority Data

| Sep. 19, 1995 | [JP] | Japan | 7-239632 |
| Oct. 5, 1995 | [JP] | Japan | 7-258571 |
| Feb. 14, 1996 | [JP] | Japan | 8-026608 |
| Feb. 14, 1996 | [JP] | Japan | 8-026609 |
| Aug. 23, 1996 | [JP] | Japan | 8-222426 |

[51] Int. Cl.$^6$ ................................................ G02B 15/14
[52] U.S. Cl. .......................................... 359/692; 359/717
[58] Field of Search ..................................... 359/692, 717

[56] References Cited

U.S. PATENT DOCUMENTS

| 4,936,661 | 6/1990 | Betensky et al. | 359/692 |
| 5,162,947 | 11/1992 | Ito | 359/692 |
| 5,168,403 | 12/1992 | Umeda et al. | 359/692 |
| 5,218,478 | 6/1993 | Itoh | 359/692 |
| 5,270,861 | 12/1993 | Estelle | 359/683 |
| 5,270,867 | 12/1993 | Estelle | 359/692 |
| 5,309,285 | 5/1994 | Ito | 359/692 |
| 5,315,440 | 5/1994 | Betensky et al. | 359/692 |
| 5,327,290 | 7/1994 | Fukushima et al. | 359/692 |
| 5,341,244 | 8/1994 | Lin | 359/692 |
| 5,386,321 | 1/1995 | Kawamura | 359/692 |
| 5,418,647 | 5/1995 | Ishisaka | 359/692 |
| 5,434,712 | 7/1995 | Ito | 359/692 |
| 5,479,295 | 12/1995 | Ohtake | 359/692 |
| 5,541,773 | 7/1996 | Kamo et al. | 359/692 |
| 5,610,767 | 3/1997 | Ito | 359/692 |
| 5,663,837 | 9/1997 | Ohtake et al. | 359/692 |
| 5,663,838 | 9/1997 | Hasushita et al. | 359/692 |
| 5,798,873 | 8/1998 | Hoshi et al. | 359/692 |
| 5,808,812 | 9/1998 | Kamo | 359/692 |
| 5,815,324 | 9/1998 | Yamamoto | 359/692 |
| 5,825,557 | 10/1998 | Ohno | 359/692 |
| 5,864,435 | 1/1999 | Toyama | 359/692 |

FOREIGN PATENT DOCUMENTS 5249375  9/1993  Japan ................................. 359/692

Primary Examiner—Georgia Epps
Assistant Examiner—Evelyn A. Lester
Attorney, Agent, or Firm—Price, Gess & Ubell

[57] ABSTRACT

A zoom lens system is composed of two lens units. The first lens unit is arranged at an object-side end and the second lens unit is arranged at an image-side end. The first lens unit has one lens element of a positive refractive power. The second lens unit has two lens elements. One is an aspherical plastic lens of non-refractive power. The other is a lens having a negative refractive power. During zooming from a wide angle end to a telephoto end, the distance between the first and second lens units is decreased.

14 Claims, 24 Drawing Sheets

FNO=4.98
—— d
---- SC
-0.5    0.5
SPHERICAL  SINE
ABERRATION CONDITION

Y'=21.6
---- DM
—— DS
-0.5    0.5
ASTIGMATISM

Y'=21.6
-5.0    5.0
DISTORTION %

FNO=6.42
—— d
---- SC
-0.5    0.5
SPHERICAL  SINE
ABERRATION CONDITION

Y'=21.6
---- DM
—— DS
-0.5    0.5
ASTIGMATISM

Y'=21.6
-5.0    5.0
DISTORTION %

FNO=9.57
—— d
---- SC
-0.5    0.5
SPHERICAL  SINE
ABERRATION CONDITION

Y'=21.6
---- DM
—— DS
-0.5    0.5
ASTIGMATISM

Y'=21.6
-5.0    5.0
DISTORTION %

FNO=4.98
—— d
---- SC
-0.5   0.5
SPHERICAL  SINE
ABERRATION CONDITION

Y'=21.6
---- DM
—— DS
-0.5   0.5
ASTIGMATISM

Y'=21.6
-5.0   5.0
DISTORTION %

FNO=6.42
—— d
---- SC
-0.5   0.5
SPHERICAL  SINE
ABERRATION CONDITION

Y'=21.6
---- DM
—— DS
-0.5   0.5
ASTIGMATISM

Y'=21.6
-5.0   5.0
DISTORTION %

FNO=9.57
—— d
---- SC
-0.5   0.5
SPHERICAL  SINE
ABERRATION CONDITION

Y'=21.6
---- DM
—— DS
-0.5   0.5
ASTIGMATISM

Y'=21.6
-5.0   5.0
DISTORTION %

FNO=4.99

—— d
---- SC

-0.5  0.5
SPHERICAL SINE
ABERRATION CONDITION

Y'=21.6

---- DM
—— DS

-0.5  0.5
ASTIGMATISM

Y'=21.6

-5.0  5.0
DISTORTION %

FNO=6.42

—— d
---- SC

-0.5  0.5
SPHERICAL SINE
ABERRATION CONDITION

Y'=21.6

---- DM
—— DS

-0.5  0.5
ASTIGMATISM

Y'=21.6

-5.0  5.0
DISTORTION %

FNO=9.58

—— d
---- SC

-0.5  0.5
SPHERICAL SINE
ABERRATION CONDITION

Y'=21.6

---- DM
—— DS

-0.5  0.5
ASTIGMATISM

Y'=21.6

-5.0  5.0
DISTORTION %

FNO=5.14
—— d
---- SC
-0.5   0.5
SPHERICAL   SINE
ABERRATION  CONDITION

Y'=21.6
---- DM
—— DS
-0.5   0.5
ASTIGMATISM

Y'=21.6
-5.0   5.0
DISTORTION %

FNO=6.62
—— d
---- SC
-0.5   0.5
SPHERICAL   SINE
ABERRATION  CONDITION

Y'=21.6
---- DM
—— DS
-0.5   0.5
ASTIGMATISM

Y'=21.6
-5.0   5.0
DISTORTION %

FNO=9.88
—— d
---- SC
-0.5   0.5
SPHERICAL   SINE
ABERRATION  CONDITION

Y'=21.6
---- DM
—— DS
-0.5   0.5
ASTIGMATISM

Y'=21.6
-5.0   5.0
DISTORTION %

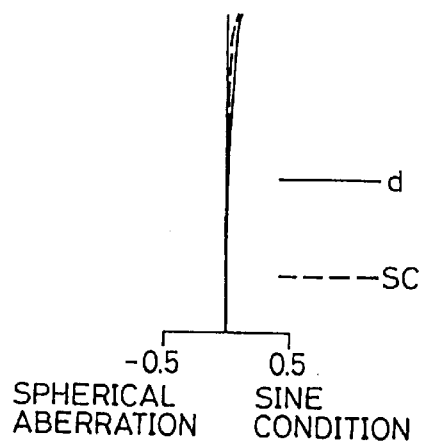
FIG. 13A
FNO=5.05
FIG. 13B
Y'=21.6
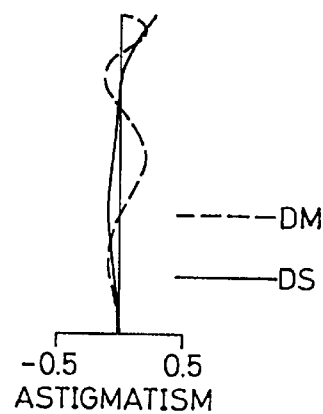
FIG. 13C
Y'=21.6
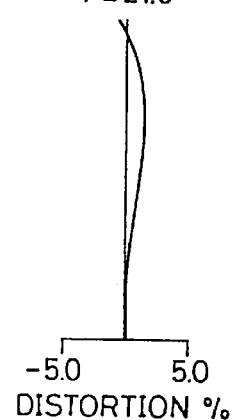
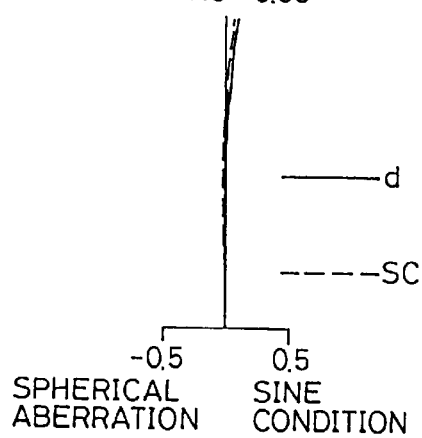
FIG. 13D
FNO=6.55
FIG. 13E
Y'=21.6
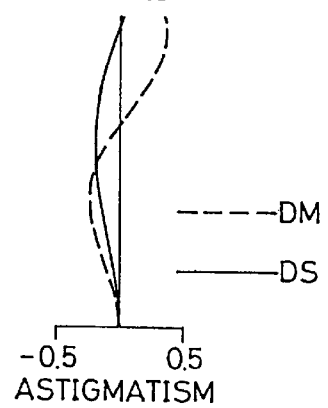
FIG. 13F
Y'=21.6
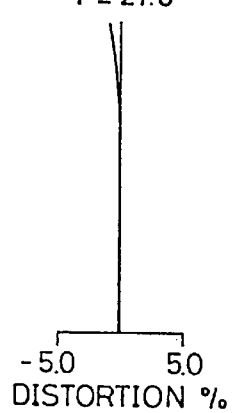
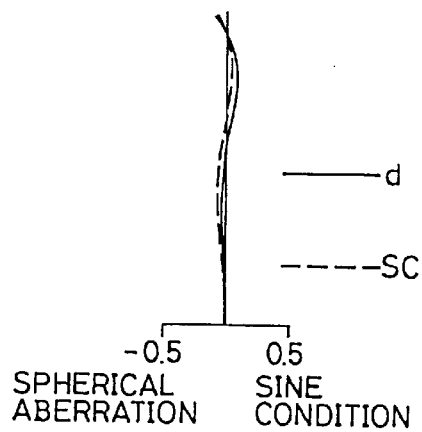
FIG. 13G
FNO=9.39
FIG. 13H
Y'=21.6
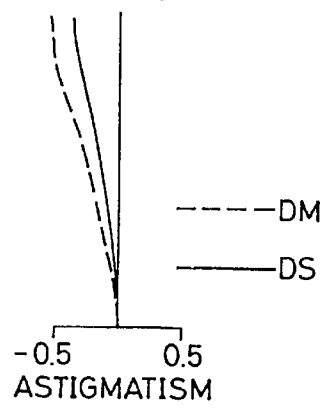
FIG. 13I
Y'=21.6
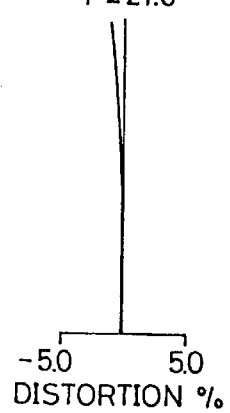

FNO=4.98

SPHERICAL ABERRATION / SINE CONDITION

Y'=21.6

ASTIGMATISM

Y'=21.6

DISTORTION %

FNO=6.42

SPHERICAL ABERRATION / SINE CONDITION

Y'=21.6

ASTIGMATISM

Y'=21.6

DISTORTION %

FNO=9.35

SPHERICAL ABERRATION / SINE CONDITION

Y'=21.6

ASTIGMATISM

Y'=21.6

DISTORTION %

FNO=5.04
— d
----SC
-0.5  0.5
SPHERICAL ABERRATION
SINE CONDITION

Y'=21.6
----DM
——DS
-0.5  0.5
ASTIGMATISM

Y'=21.6
-5.0  5.0
DISTORTION %

FNO=6.50
— d
----SC
-0.5  0.5
SPHERICAL ABERRATION
SINE CONDITION

Y'=21.6
----DM
——DS
-0.5  0.5
ASTIGMATISM

Y'=21.6
-5.0  5.0
DISTORTION %

FNO=9.45
— d
----SC
-0.5  0.5
SPHERICAL ABERRATION
SINE CONDITION

Y'=21.6
----DM
——DS
-0.5  0.5
ASTIGMATISM

Y'=21.6
-5.0  5.0
DISTORTION %

FNO=5.05

SPHERICAL ABERRATION / SINE CONDITION

Y'=21.6

ASTIGMATISM

Y'=21.6

DISTORTION %

FNO=6.55

SPHERICAL ABERRATION / SINE CONDITION

Y'=21.6

ASTIGMATISM

Y'=21.6

DISTORTION %

FNO=9.39

SPHERICAL ABERRATION / SINE CONDITION

Y'=21.6

ASTIGMATISM

Y'=21.6

DISTORTION %

FNO=5.90
—— d
---- SC
-1.0    1.0
SPHERICAL  SINE
ABERRATION  CONDITION

Y'=21.6
---- DM
—— DS
-1.0    1.0
ASTIGMATISM

Y'=21.6
-5.0    5.0
DISTORTION %

FNO=7.53
—— d
---- SC
-1.0    1.0
SPHERICAL  SINE
ABERRATION  CONDITION

Y'=21.6
---- DM
—— DS
-1.0    1.0
ASTIGMATISM

Y'=21.6
-5.0    5.0
DISTORTION %

FNO=9.57
—— d
---- SC
-1.0    1.0
SPHERICAL  SINE
ABERRATION  CONDITION

Y'=21.6
---- DM
—— DS
-1.0    1.0
ASTIGMATISM

Y'=21.6
-5.0    5.0
DISTORTION %

FNO=5.90

— d
----SC

-1.0  1.0
SPHERICAL  SINE
ABERRATION  CONDITION

Y'=21.6

----DM
—DS

-1.0  1.0
ASTIGMATISM

Y'=21.6

-5.0  5.0
DISTORTION %

FNO=7.53

— d
----SC

-1.0  1.0
SPHERICAL  SINE
ABERRATION  CONDITION

Y'=21.6

----DM
—DS

-1.0  1.0
ASTIGMATISM

Y'=21.6

-5.0  5.0
DISTORTION %

FNO=9.57

— d
----SC

-1.0  1.0
SPHERICAL  SINE
ABERRATION  CONDITION

Y'=21.6

----DM
—DS

-1.0  1.0
ASTIGMATISM

Y'=21.6

-5.0  5.0
DISTORTION %

FNO=5.90

—— d
---- SC

-1.0    1.0
SPHERICAL  SINE
ABERRATION CONDITION

Y'=21.6

---- DM
—— DS

-1.0    1.0
ASTIGMATISM

Y'=21.6

-5.0    5.0
DISTORTION %

FNO=6.99

—— d
---- SC

-1.0    1.0
SPHERICAL  SINE
ABERRATION CONDITION

Y'=21.6

---- DM
—— DS

-1.0    1.0
ASTIGMATISM

Y'=21.6

-5.0    5.0
DISTORTION %

FNO=9.31

—— d
---- SC

-1.0    1.0
SPHERICAL  SINE
ABERRATION CONDITION

Y'=21.6

---- DM
—— DS

-1.0    1.0
ASTIGMATISM

Y'=21.6

-5.0    5.0
DISTORTION %

FNO=5.80

Y'=21.6

Y'=21.6

FNO=6.87

Y'=21.6

Y'=21.6

FNO=9.12

Y'=21.6

Y'=21.6

FNO=5.40

—— d
---- SC

-1.0　　1.0
SPHERICAL　SINE
ABERRATION　CONDITION

Y'=21.6

---- DM
—— DS

-1.0　　1.0
ASTIGMATISM

Y'=21.6

-5.0　　5.0
DISTORTION %

FNO=6.88

—— d
---- SC

-1.0　　1.0
SPHERICAL　SINE
ABERRATION　CONDITION

Y'=21.6

---- DM
—— DS

-1.0　　1.0
ASTIGMATISM

Y'=21.6

-5.0　　5.0
DISTORTION %

FNO=10.27

—— d
---- SC

-1.0　　1.0
SPHERICAL　SINE
ABERRATION　CONDITION

Y'=21.6

---- DM
—— DS

-1.0　　1.0
ASTIGMATISM

Y'=21.6

-5.0　　5.0
DISTORTION %

FNO=5.80
—d
-----SC
-1.0  1.0
SPHERICAL  SINE
ABERRATION  CONDITION

Y'=21.6
-----DM
—DS
-1.0  1.0
ASTIGMATISM

Y'=21.6
-5.0  5.0
DISTORTION %

FNO=6.87
—d
-----SC
-1.0  1.0
SPHERICAL  SINE
ABERRATION  CONDITION

Y'=21.6
-----DM
—DS
-1.0  1.0
ASTIGMATISM

Y'=21.6
-5.0  5.0
DISTORTION %

FNO=9.12
—d
-----SC
-1.0  1.0
SPHERICAL  SINE
ABERRATION  CONDITION

Y'=21.6
-----DM
—DS
-1.0  1.0
ASTIGMATISM

Y'=21.6
-5.0  5.0
DISTORTION %

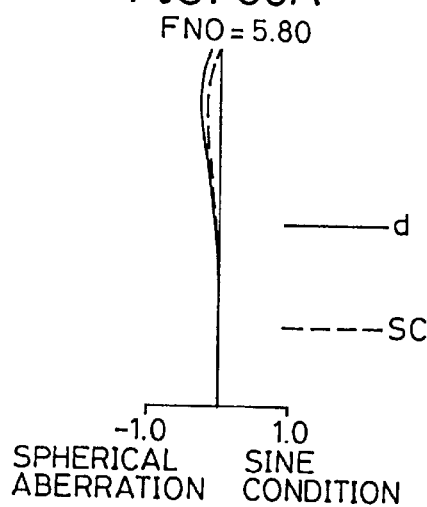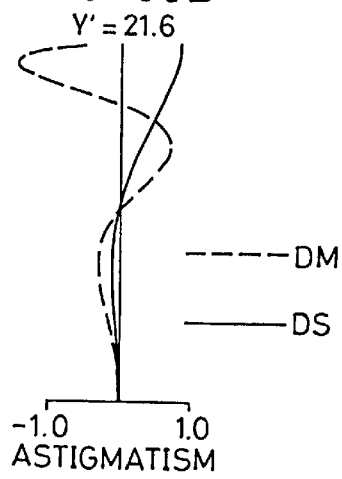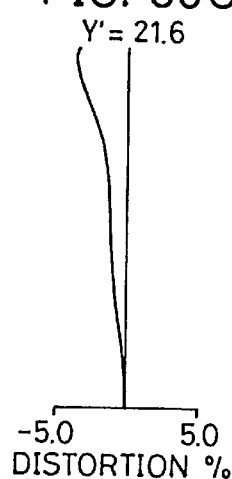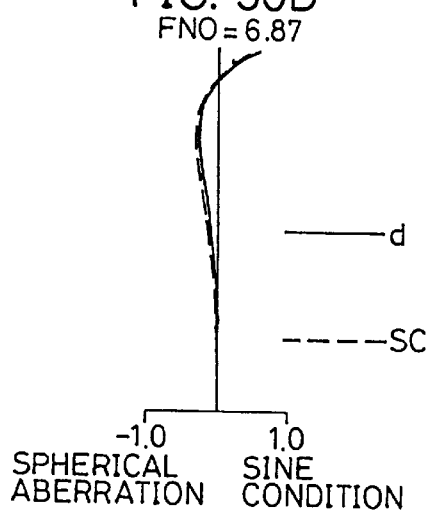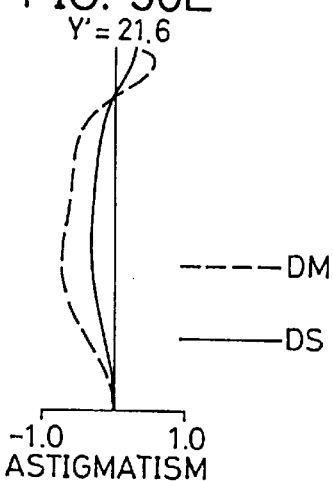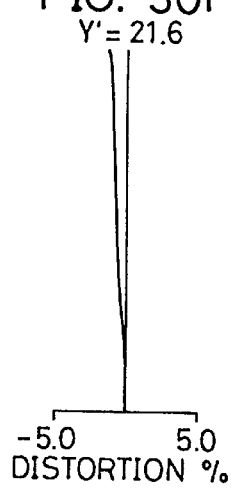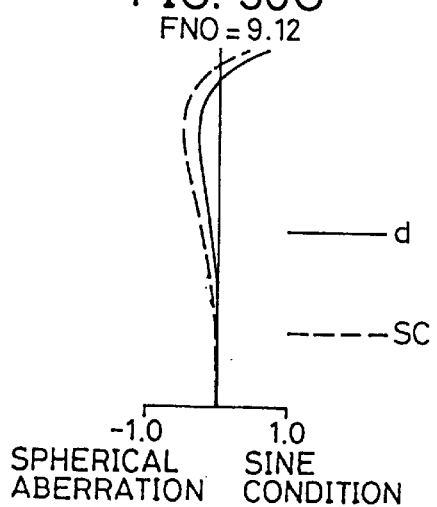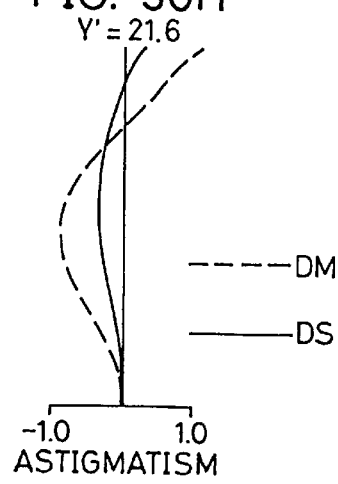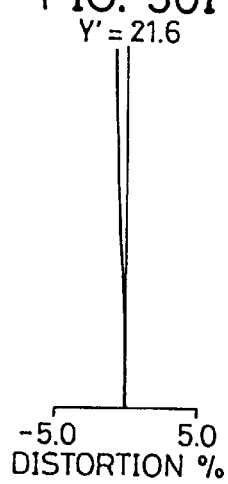

ZOOM LENS SYSTEM FOR A LENS SHUTTER CAMERA

RELATED APPLICATIONS

This is a divisional application of U.S. patent application Ser. No. 08/712,257, filed on Sep. 11, 1996, now U.S. Pat. No. 5,815,324.

BACKGROUND OF THE INVENTION

1. Field of the Invention

The present invention relates to a zoom lens system, more particularly to a zoom lens system suitably used as a taking lens system in lens shutter cameras.

2. Description of the Prior Art

It is required that a zoom lens system used as a taking lens system in lens shutter cameras be made as compact and low-cost as possible, without diminishing their optical performance. As such lens system, various zoom lens systems that consist of a first lens unit having a positive refractive power and a second lens unit having a negative refractive power have been proposed.

Zoom lens systems consisting of two lens groups, however, are defective in that it is not possible, especially at the wide-angle end, to properly correct magnification chromatic aberration and distortion at the same time as securing sufficient lens-backs required in a taking lens system for cameras.

Recently, even in the zoom lens system consisting of two lens groups, use of single lenses made of plastic is preferred nowadays in consideration of cost reduction. It is not possible, however, to obtain sufficient optical performance by simply aking such lens-system-constituting single lenses using lastic. This is because ambient temperature variation causes ariation in the shape and refractive power of the plastic lenses, with the result that the focal point of the whole system varies. To solve this problem, U.S. Pat. No. 5,368,321 and Japanese Laid-Open Patent Application No. H5-113537 propose a two-lens-group zoom lens system in which the variation in focal point of a plastic lens is corrected. This type of zoom lens system, however, is defective in that the plastic lens in it is far from serving well enough to correct aberration, because the plastic lens is designed to have almost no refractive power.

Moreover, U.S. Pat. No. 5,327,290 proposes a zoom lens system consisting of a front lens unit composed of one positive lens, and a rear lens unit composed of one negative lens.

Moreover, U.S. Pat. No. 5,218,478 proposes a zoom lens system consisting of a first lens unit composed of two single lenses and having a positive refractive power as a whole, and a second lens unit composed of one negative lens.

The zoom lens systems disclosed in U.S. Pat. Nos. 5,327,290 and 5,218,478, however, are defective in that chromatic aberration cannot be corrected properly.

SUMMARY OF THE INVENTION

An object of the present invention is to provide a zoom lens system that offers sufficient optical performance despite its compactness.

Another object of the present invention is to provide a zoom lens system whose image forming performance is less susceptible to ambient temperature variation.

Still another object of the present invention is to provide a zoom lens system in which chromatic aberration can be corrected properly despite its compactness.

To achieve the above objects, according to the present invention, a zoom lens system comprises, from the object-side end, a first lens unit having a positive refractive power, and a second lens unit having a negative refractive power, wherein the distance between the first and second lens units is decreased during zooming from the shortest focal length end to the longest focal length end.

Alternatively, according to the present invention, in a zoom lens system comprising, from the object-side end, a first lens unit having a positive refractive power, and a second lens unit having a negative refractive power, wherein the distance between the first and second lens units is decreased during zooming from the shortest focal length end to the longest focal length end, said first and second lens units each include at least one plastic lens, and the following conditions are satisfied:

$$-0.6 < \phi Lp1/\phi 1 < -0.2$$

$$0.2 < \phi Lp2/\phi 1 < 0.6$$

where $\phi Lp1$: refractive power of the plastic lens in the first lens unit;

$\phi Lp2$: refractive power of the plastic lens in the second lens unit;

$\phi 1$: composite refractive power of the first unit.

Alternatively, according to the present invention, in a zoom lens system comprising, from the object-side end, a first lens unit consisting of one positive lens element, and a second lens unit consisting of two lens elements and having a negative refractive power as a whole, the distance between the first and second lens units is decreased during zooming from the wide-angle end to the telephoto end.

According to another aspect of the present invention, in a zoom lens system comprising, from the object-side end, a first lens unit consisting of one positive lens element, and a second lens unit having a negative refractive power, the distance between the first and second lens units is decreased during zooming from the wide-angle end to the telephoto end, and the following condition is satisfied:

$$0.9 < |\phi 1/\phi 2| < 1.3$$

where $\phi 1$: composite refractive power of the first lens unit;

$\phi 2$: composite refractive power of the second lens unit.

Alternatively, according to the present invention, in a zoom lens system comprising, from the object side, a first lens unit composed of two single lens elements and having a positive refractive power as a whole, and a second lens unit composed of one negative lens element, the distance between the first and second lens units is decreased during zooming from the shortest focal length end to the longest focal length end, and the following conditions are satisfied:

$$N21 < 1.55$$

$$v21 > 55$$

where

N21: d-lines refractive coefficient of the negative lens in the second lens unit;

v21: Abbe number of the negative lens in the second lens unit.

BRIEF DESCRIPTION OF THE DRAWINGS

This and other objects and features of this invention will become clear from the following description, taken in conjunction with the preferred embodiments with reference to the accompanied drawings in which:

FIGS. 13A to 13I are diagrams showing aberration curves of the fifth embodiment;

FIGS. 30A to 30I are diagrams showing aberration curves of the fifteenth embodiment.

DESCRIPTION OF THE PREFERRED EMBODIMENTS

Figure 1:
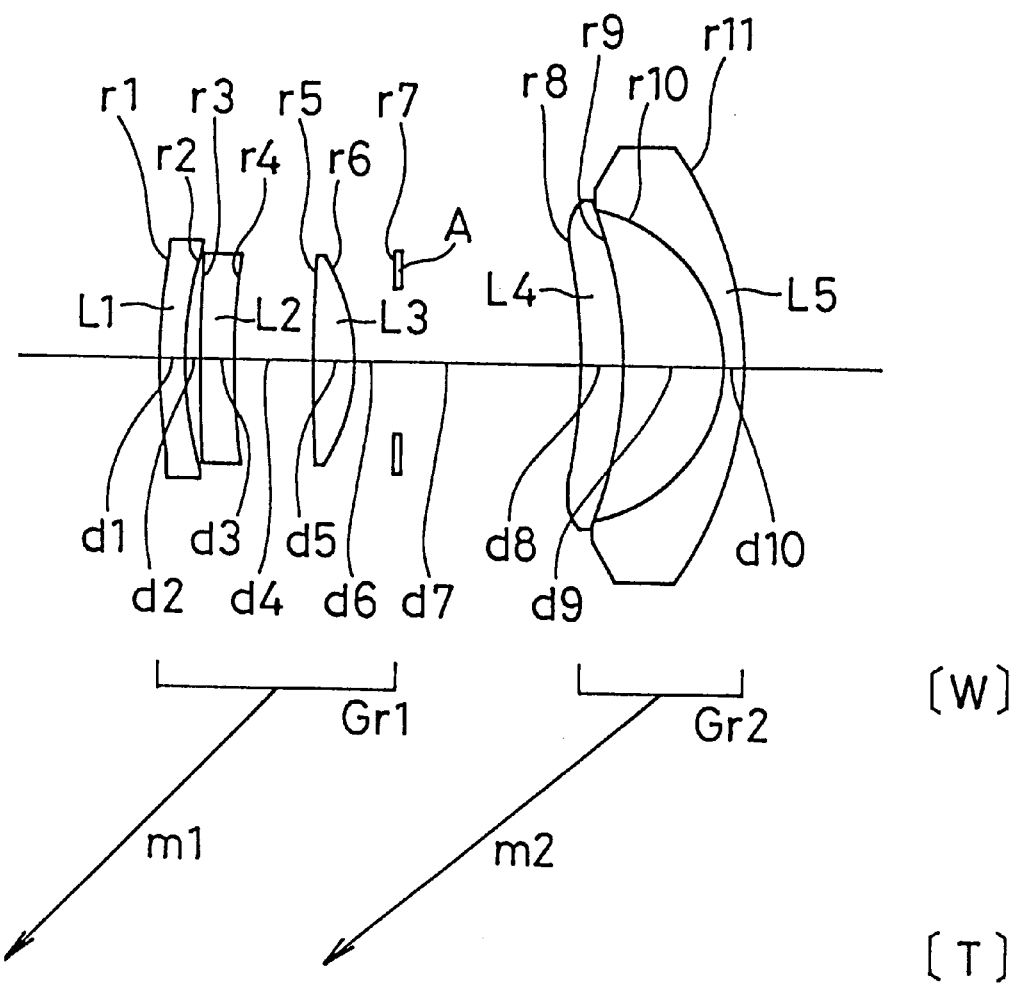
FIG. 1 is a diagram showing the lens construction of a first embodiment of the present invention.

Hereinafter, zoom lens systems embodying the present invention will be presented. Note that, in each embodiment, ri (r=1, 2, 3, . . . ) represents the curvature radius of the i-th surface from the object-side end, di (i=1, 2, 3, . . . ) represents the i-th axial distance from the object-side end, and Ni (i=1, 2, 3, . . . ) and vi (i=1, 2, 3, . . . ) represent the d-lines refractive coefficient and the Abbe number, respectively, of the i-th lens from the object-side end. Moreover, values of the axial distance d7 between the first and second lens units, the focal length f of the whole system, and the f-number Fno are shown; these values correspond, from the left, to the wide-angle end (W), the medium focal length (M), and the telephoto end (T). Furthermore, the surface marked with ∞ (infinite) in its curvature radius column is a surface that is perpendicular to the optical axis (that is, the curvature radius of that surface is infinite).

Note also that, in each embodiment, a surface marked with * in its curvature radius column is an aspherical surface, the shape of which can be defined by the following expression (A).

$$X = C \cdot Y^2 \Big/ \left\{ 1 + \sqrt{(1 - \epsilon \cdot Y^2 \cdot C^2)} \right\} + \sum Ai \cdot Yi \qquad (A)$$

where

X: displacement from the reference surface in the optical axis direction;

Y: height in the direction perpendicular to the optical axis;

C: reference curvature of the aspherical surface;

$\epsilon$: quadric surface parameter;

Ai (i=1, 2, 3 . . . ): aspherical coefficient;

Yi (i=1, 2, 3 . . . ): Y raised to the i-th power.

Furthermore, note that the digits following the letter E in a value of aspherical coefficient represent the exponent portion of the aspherical coefficient; for example, 1.0×10E2 represents $1.0 \times 10^2$.

TABLE 1

Embodiment 1
f = 35.7~46.0~68.6
Fno = 4.98~6.42~9.57

| | Curvature Radius | Axial Surface Distance | | Refractive Index | | Abbe Number | |
|---|---|---|---|---|---|---|---|
| r1* | 22.648 | | | | | | |
| | | d1 | 1.250 | N1 | 1.58340 | v1 | 30.23 |
| r2 | 21.358 | | | | | | |
| | | d2 | 0.711 | | | | |
| r3 | 95.401 | | | | | | |
| | | d3 | 1.600 | N2 | 1.84666 | v2 | 23.83 |
| r4 | 33.289 | | | | | | |
| | | d4 | 3.700 | | | | |
| r5 | 58.259 | | | | | | |
| | | d5 | 2.017 | N3 | 1.51680 | v3 | 64.20 |
| r6 | −10.460 | | | | | | |
| | | d6 | 2.050 | | | | |
| r7 | ∞ (aperture) | | | | | | |
| | | d7 | 8.851~5.676~2.050 | | | | |

TABLE 1-continued

| | | | | | | | |
|---|---|---|---|---|---|---|---|
| r8* | −22.375 | | | | | | |
| | | d8 | 2.000 | N4 | 1.58340 | ν4 | 30.23 |
| r9 | −20.727 | | | | | | |
| | | d9 | 4.881 | | | | |
| r10 | −7.681 | | | | | | |
| | | d10 | 1.000 | N5 | 1.65844 | ν5 | 50.85 |
| r11 | −17.944 | | | | | | |

Aspherical Coefficient r1
$\epsilon$ = 0.10000 × 10
A4 = −0.21745 × 10E-3
A6 = −0.16445 × 10E-5
A8 = −0.50958 × 10E-7
A10 = −0.57513 × 10E-8
A12 = 0.10815 × 10E-9 r8
$\epsilon$ = 0.10000 × 10
A4 = 0.18231 × 10E-3
A6 = −0.38461 × 10E-5
A8 = 0.26085 × 10E-6
A10 = −0.53713 × 10E-8
A12 = 0.45517 × 10E-10

TABLE 2

Embodiment 2
f = 35.7~46.0~68.6
Fno = 4.98~6.42~9.57

| | Curvature Radius | Axial Surface Distance | | Refractive Index | | Abbe Number | |
|---|---|---|---|---|---|---|---|
| r1* | 19.096 | | | | | | |
| | | d1 | 1.250 | N1 | 1.58340 | ν1 | 30.23 |
| r2 | 18.946 | | | | | | |
| | | d2 | 0.600 | | | | |
| r3 | 17.549 | | | | | | |
| | | d3 | 1.600 | N2 | 1.84666 | ν2 | 23.83 |
| r4 | 11.888 | | | | | | |
| | | d4 | 5.000 | | | | |
| r5 | 37.729 | | | | | | |
| | | d5 | 2.067 | N3 | 1.51680 | ν3 | 64.20 |
| r6 | −10.589 | | | | | | |
| | | d6 | 2.050 | | | | |
| r7 | ∞ (aperture) | | | | | | |
| | | d7 | 8.069~5.259~2.050 | | | | |
| r8* | −25.103 | | | | | | |
| | | d8 | 2.000 | N4 | 1.58340 | ν4 | 30.23 |
| r9 | −26.998 | | | | | | |
| | | d9 | 4.928 | | | | |
| r10 | −7.032 | | | | | | |
| | | d10 | 1.000 | N5 | 1.65844 | ν5 | 50.85 |
| r11 | −14.699 | | | | | | |

Aspherical Coefficient r1
$\epsilon$ = 0.10000 × 10
A4 = −0.17216 × 10E-3
A6 = −0.19014 × 10E-5
A8 = 0.56135 × 10E-7
A10 = −0.30319 × 10E-8
A12 = 0.39430 × 10E-10 r8
$\epsilon$ = 0.10000 × 10
A4 = 0.23048 × 10E-3
A6 = −0.56151 × 10E-5
A8 = 0.41478 × 10E-6
A10 = −0.97333 × 10E-8
A12 = 0.96996 × 10E-10

TABLE 3

Embodiment 3
f = 35.7~46.0~68.6
Fno = 4.99~6.42~9.58

| | Curvature Radius | Axial Surface Distance | | Refractive Index | | Abbe Number | |
|---|---|---|---|---|---|---|---|
| r1* | 18.065 | | | | | | |
| | | d1 | 1.250 | N1 | 1.58340 | ν1 | 30.23 |
| r2 | 13.740 | | | | | | |
| | | d2 | 0.770 | | | | |
| r3 | 67.818 | | | | | | |
| | | d3 | 2.000 | N2 | 1.84666 | ν2 | 23.83 |
| r4 | 37.147 | | | | | | |
| | | d4 | 3.930 | | | | |
| r5 | 58.259 | | | | | | |
| | | d5 | 2.221 | N3 | 1.51680 | ν3 | 64.20 |
| r6 | −10.709 | | | | | | |
| | | d6 | 1.350 | | | | |
| r7 | ∞ (aperture) | | | | | | |
| | | d7 | 9.605~6.403~2.747 | | | | |
| r8* | −24.009 | | | | | | |
| | | d8 | 2.966 | N4 | 1.58340 | ν4 | 30.23 |
| r9 | −18.317 | | | | | | |
| | | d9 | 4.034 | | | | |
| r10 | −8.031 | | | | | | |
| | | d10 | 1.000 | N5 | 1.79950 | ν5 | 42.34 |
| r11 | −17.981 | | | | | | |

Aspherical Coefficient r1
$\epsilon$ = 0.10000 × 10
A4 = −0.20601 × 10E-3
A6 = −0.74300 × 10E-6
A8 = −0.55943 × 10E-7
A10 = −0.50266 × 10E-9
A12 = 0.21981 × 10E-10 r8
$\epsilon$ = 0.10000 × 10
A4 = 0.17143 × 10E-3
A6 = −0.29827 × 10E-5
A8 = 0.19737 × 10E-6
A10 = −0.37945 × 10E-8
A12 = 0.30673 × 10E-10

Figure 2:
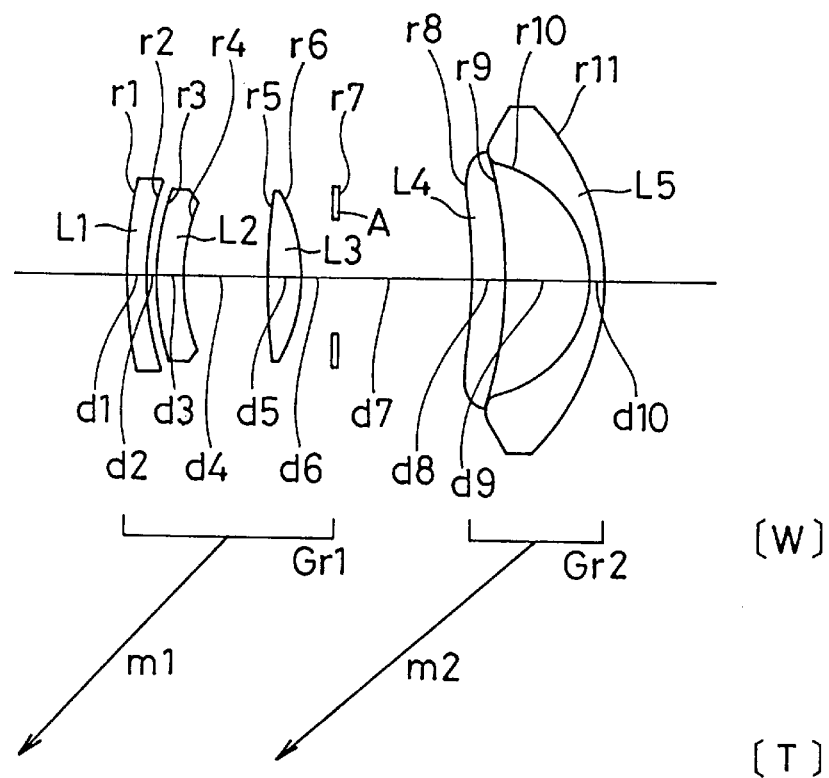
FIG. 2 is a diagram showing the lens construction of a second embodiment of the present invention.
Figure 3:
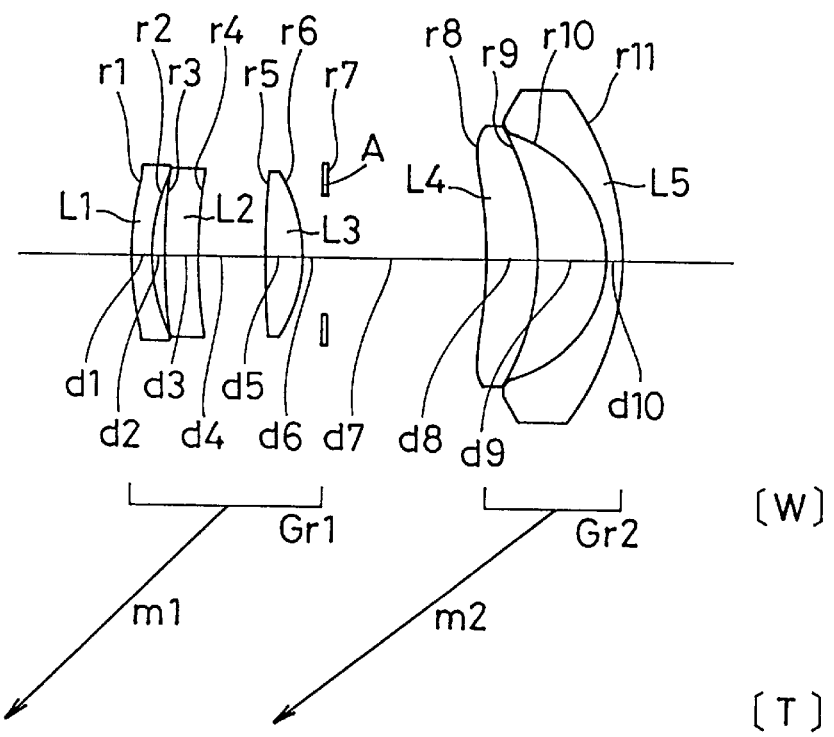
FIG. 3 is a diagram showing the lens construction of a third embodiment of the present invention.
Figure 4A:
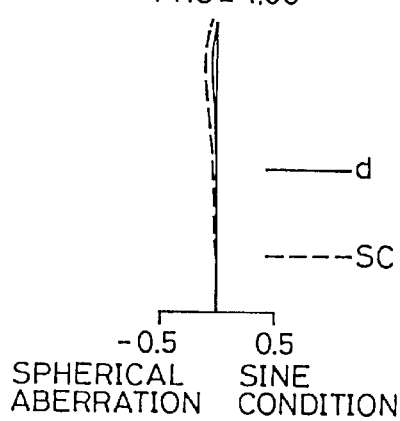
FIGS. 4A to 4I are diagrams showing aberration curves of the first embodiment.
Figure 4B:
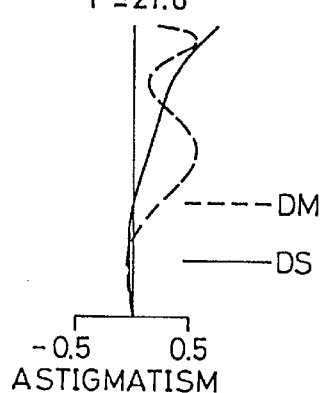
Figure 4C:
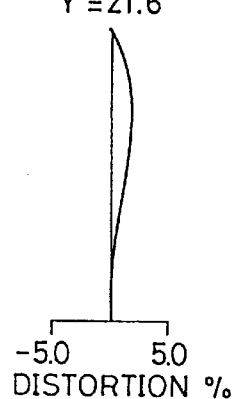
Figure 4D:
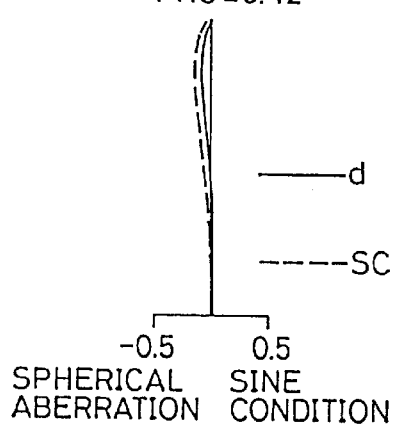
Figure 4E:
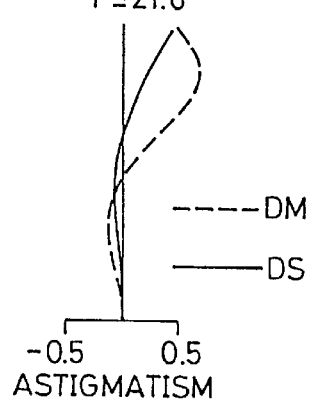
Figure 4F:
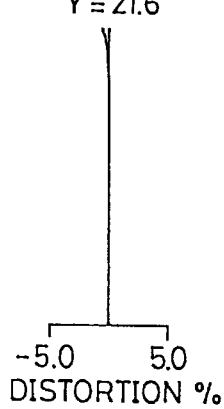
Figure 4G:
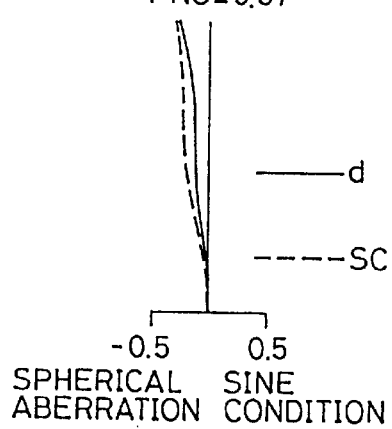
Figure 4H:
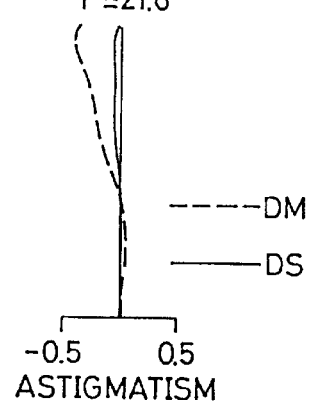
Figure 4I:
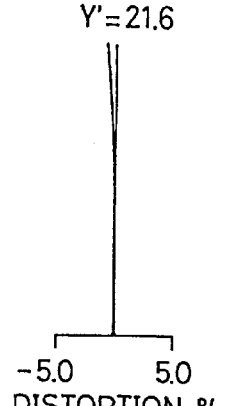
Figure 5A:
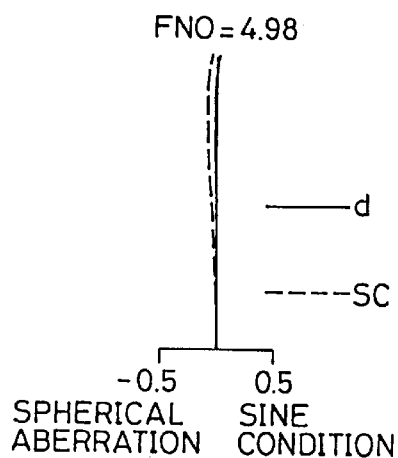
FIGS. 5A to 5I are diagrams showing aberration curves of the second embodiment.
Figure 5B:
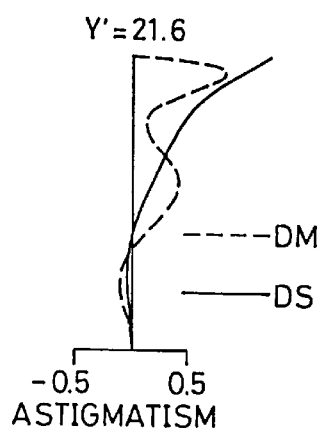
Figure 5C:
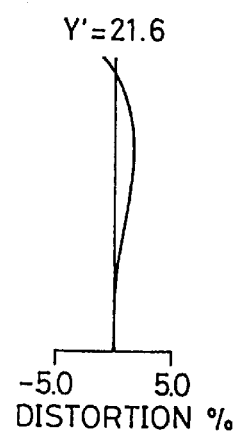
Figure 5D:
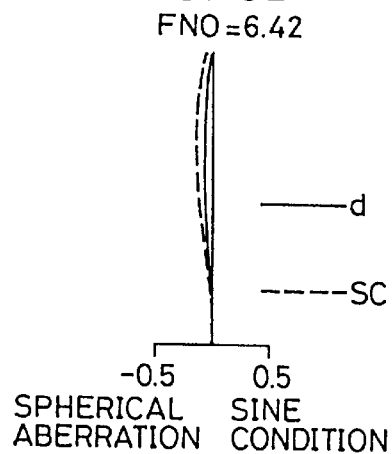
Figure 5E:
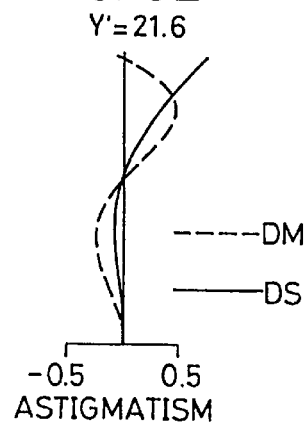
Figure 5F:
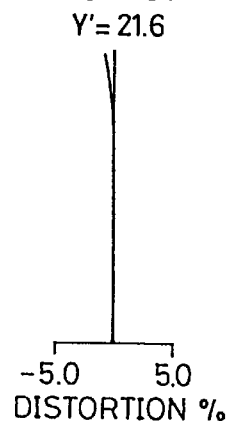
Figure 5G:
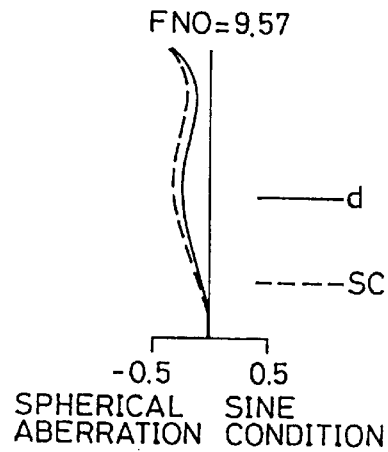
Figure 5H:
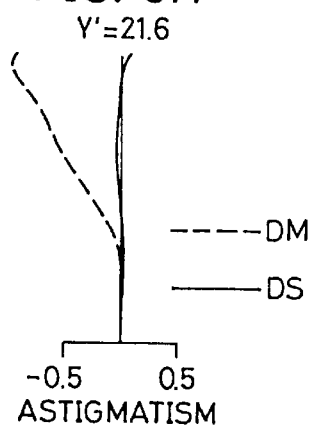
Figure 5I:
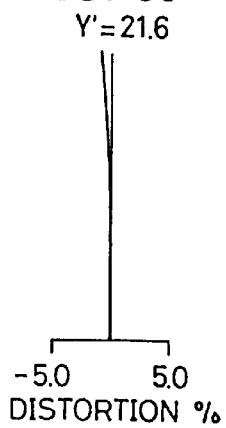
Figure 6A:
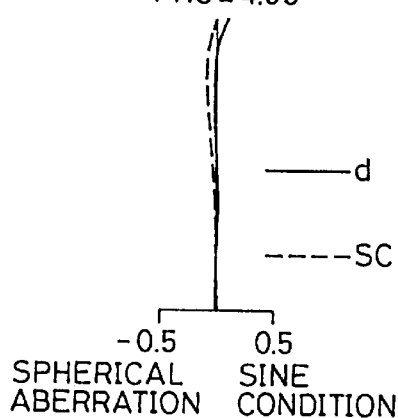
FIGS. 6A to 6I are diagrams showing aberration curves of the third embodiment.
Figure 6B:
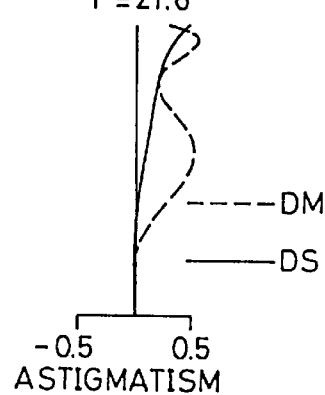
Figure 6C:
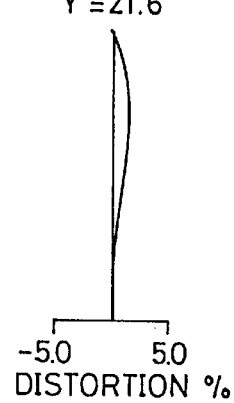
Figure 6D:
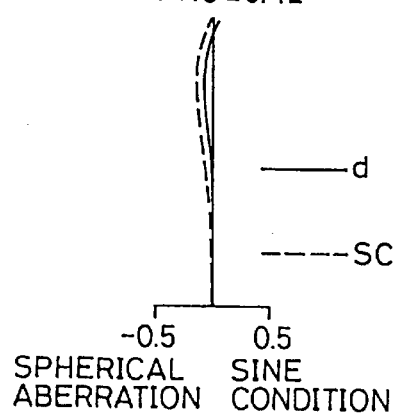
Figure 6E:
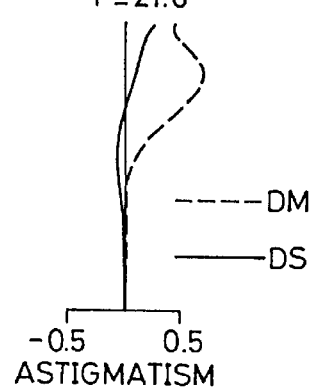
Figure 6F:
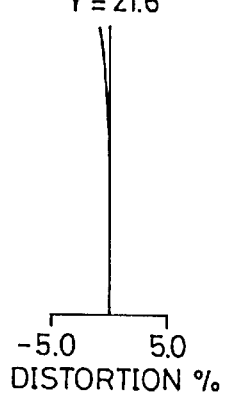
Figure 6G:
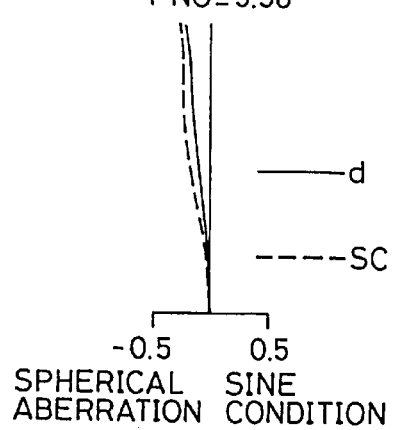
Figure 6H:
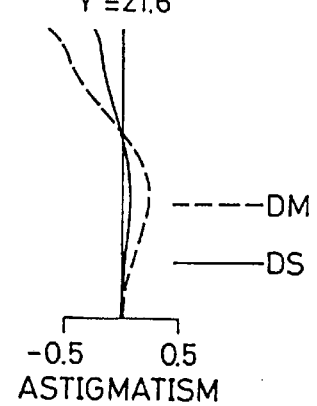
Figure 6I:
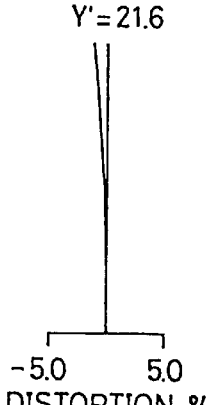
Figure 7:
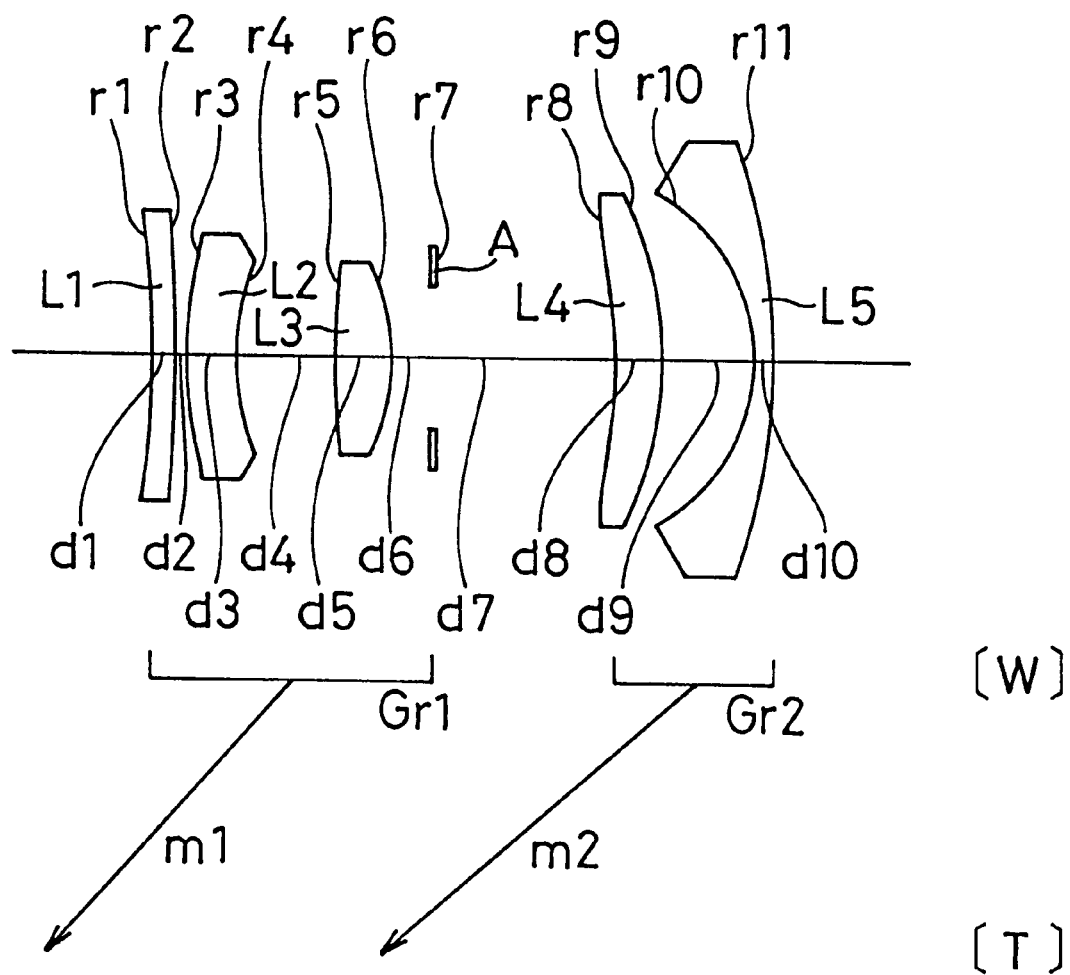
FIG. 7 is a diagram showing the lens construction at the wide-angle end of a fourth embodiment of the present invention.
Figure 8:
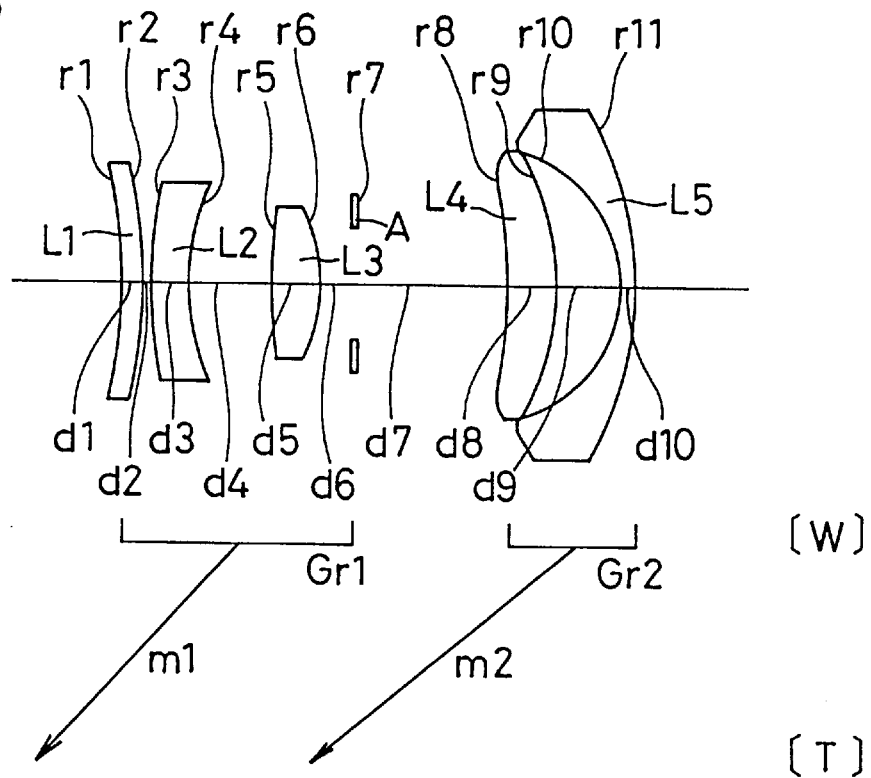
FIG. 8 is a diagram showing the lens construction at the wide-angle end of a fifth embodiment of the present invention.
Figure 9:
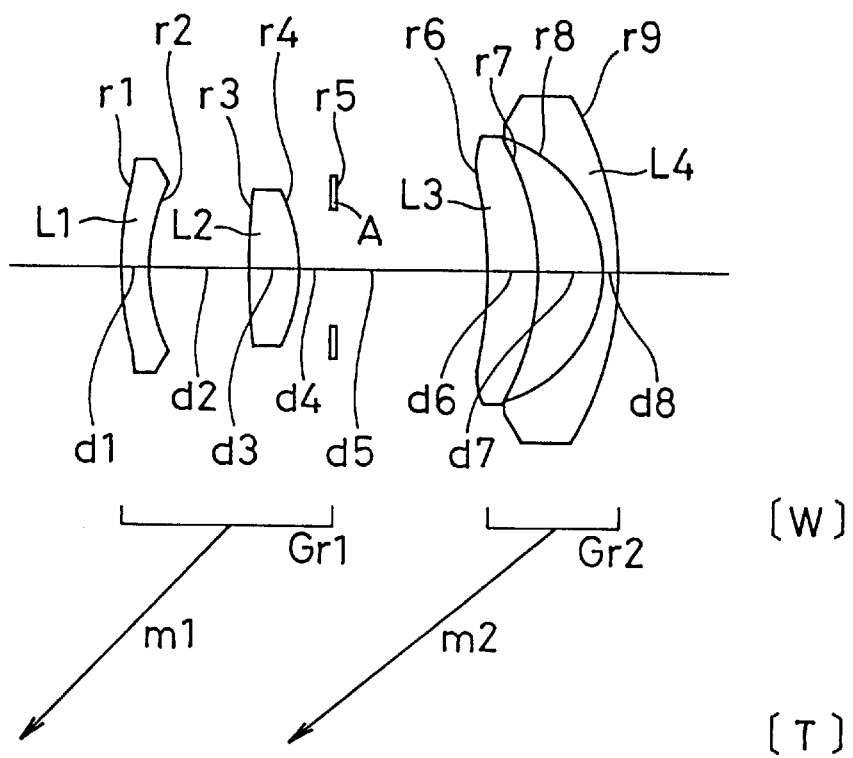
FIG. 9 is a diagram showing the lens construction at the wide-angle end of a sixth embodiment of the present invention.
Figure 10:
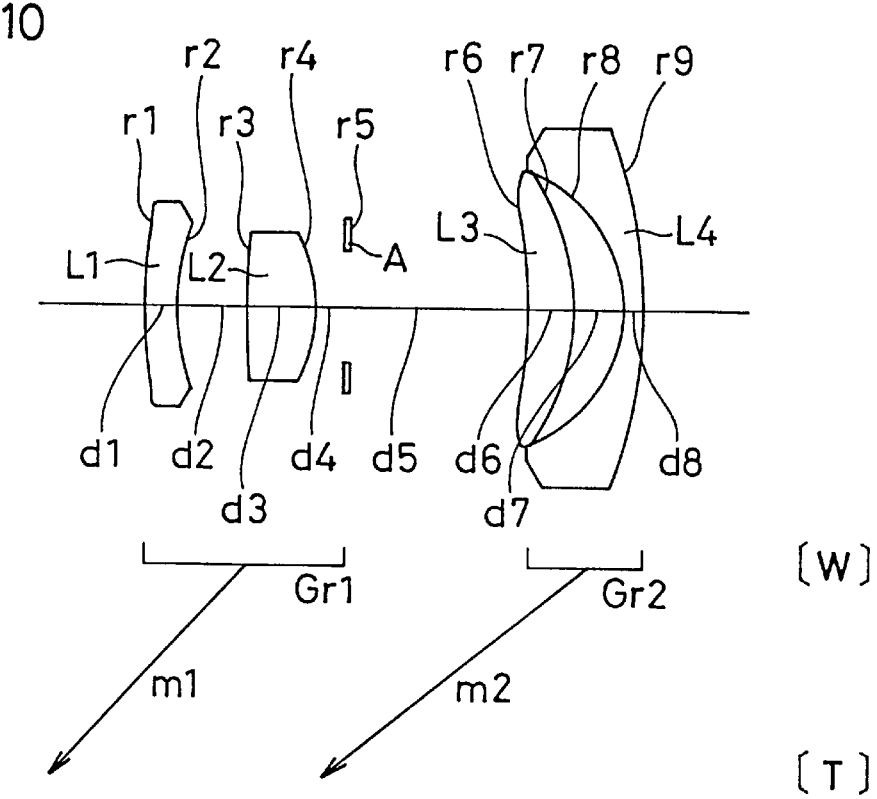
FIG. 10 is a diagram showing the lens construction at the wide-angle end of a seventh embodiment of the present invention.
Figure 11:
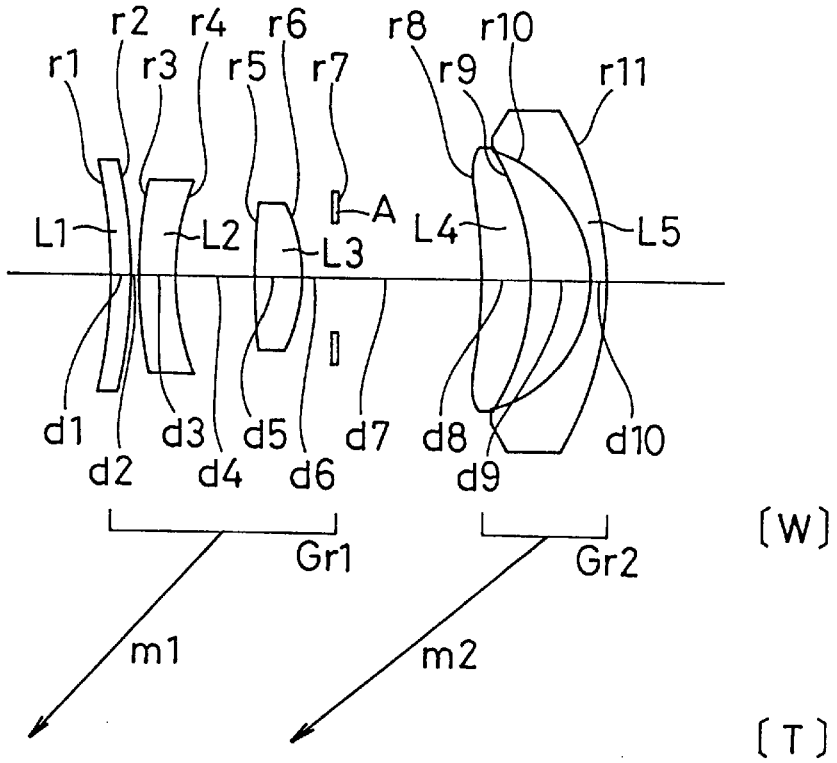
FIG. 11 is a diagram showing the lens construction at the wide-angle end of a eighth embodiment of the present invention.
Figure 12A:
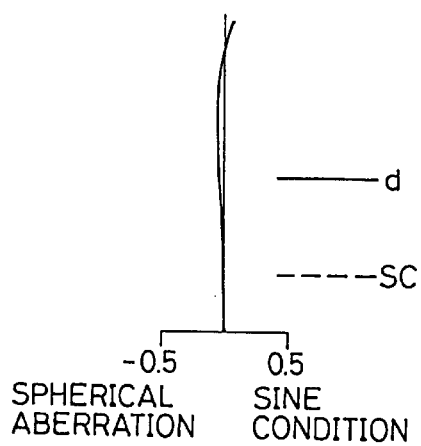
FIGS. 12A to 12I are diagrams showing aberration curves of the fourth embodiment.
Figure 12B:
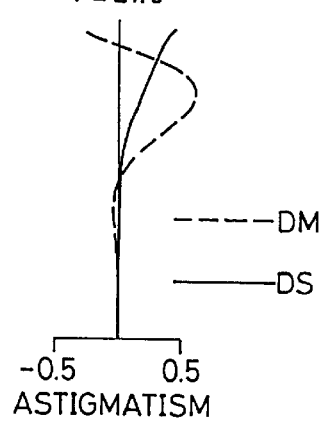
Figure 12C:
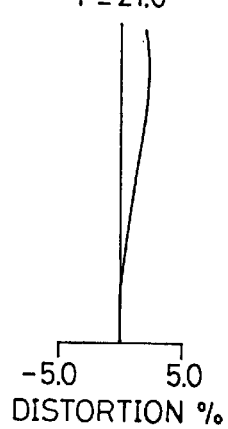
Figure 12D:
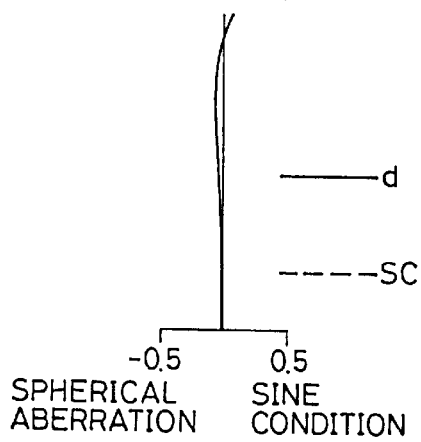
Figure 12E:
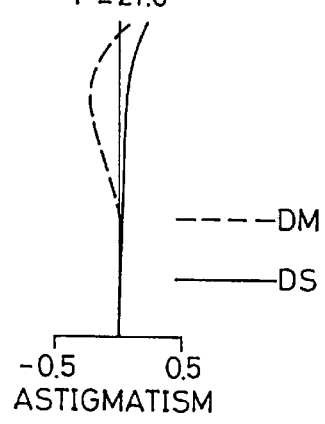
Figure 12F:
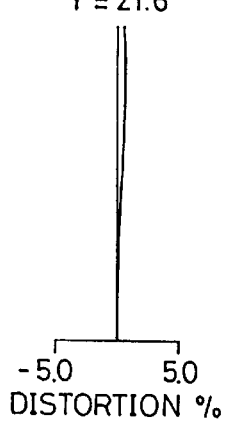
Figure 12G:
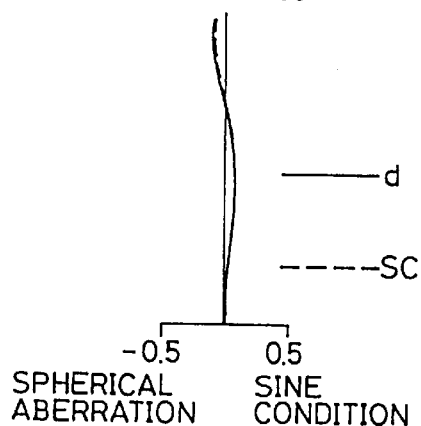
Figure 12H:
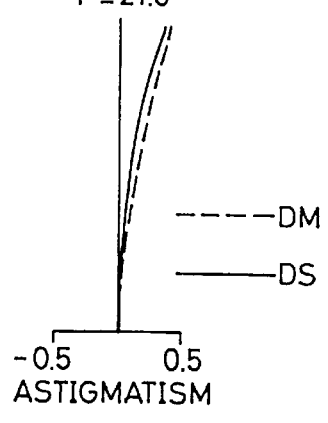
Figure 12I:
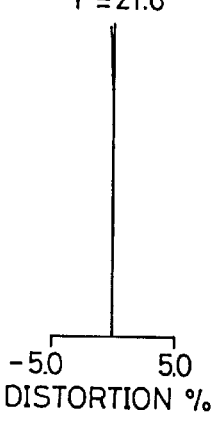
Figure 14A:
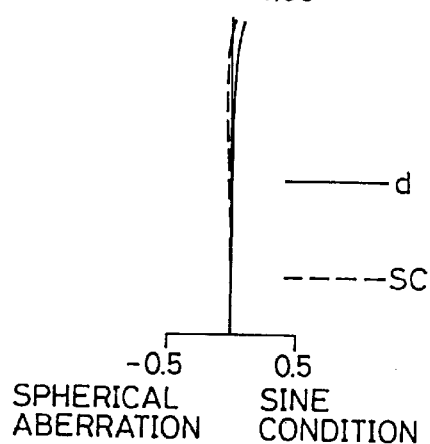
FIGS. 14A to 14I are diagrams showing aberration curves of the sixth embodiment.
Figure 14B:
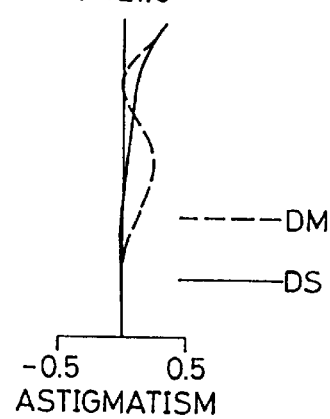
Figure 14C:
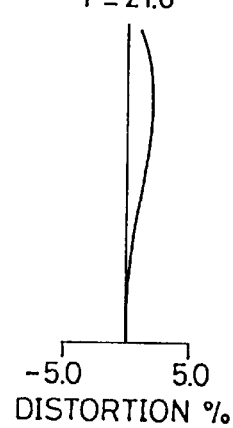
Figure 14D:
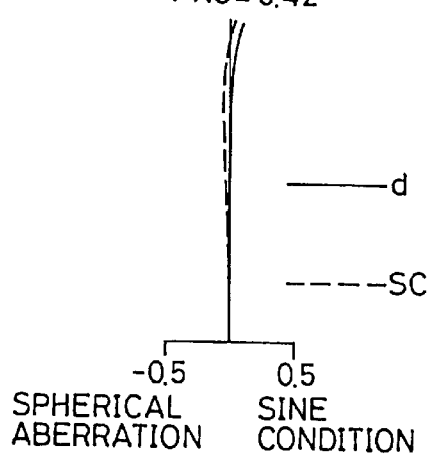
Figure 14E:
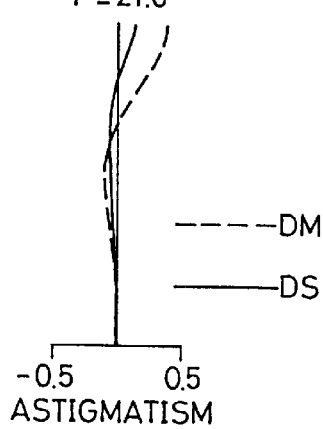
Figure 14F:
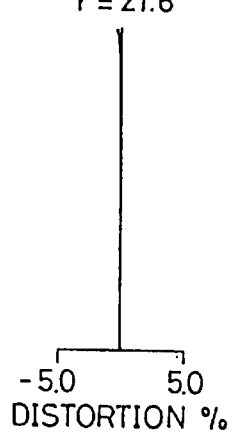
Figure 14G:
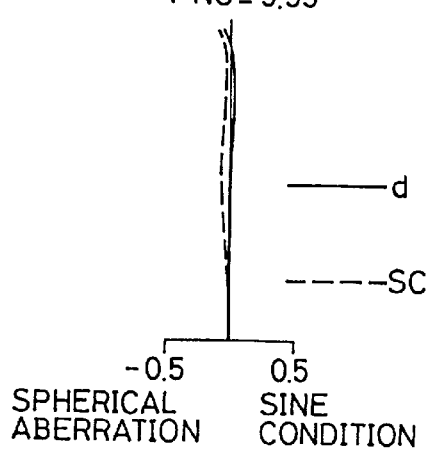
Figure 14H:
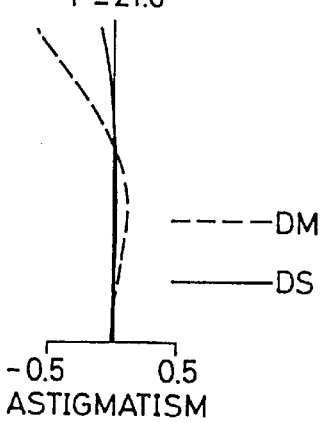
Figure 14I:
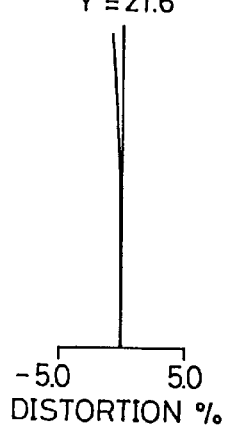
Figure 15A:
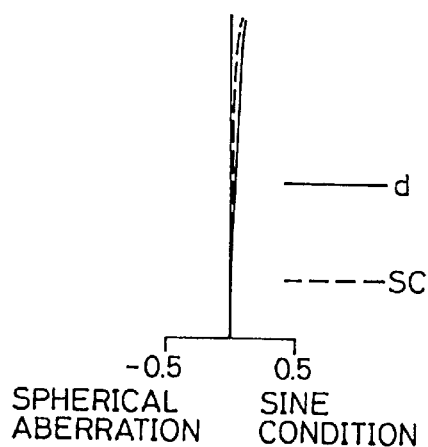
FIGS. 15A to 15I are diagrams showing aberration curves of the seventh embodiment.
Figure 15B:
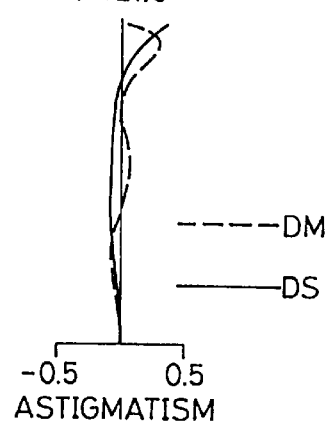
Figure 15C:
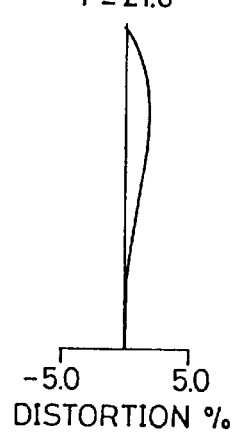
Figure 15D:
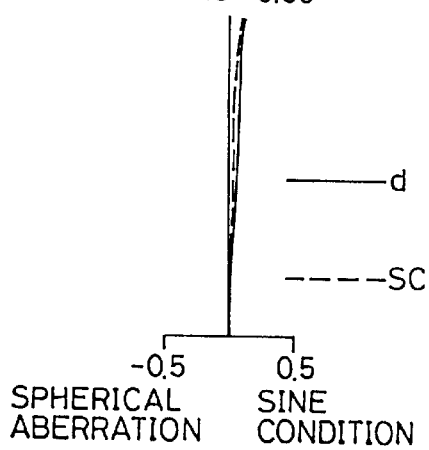
Figure 15E:
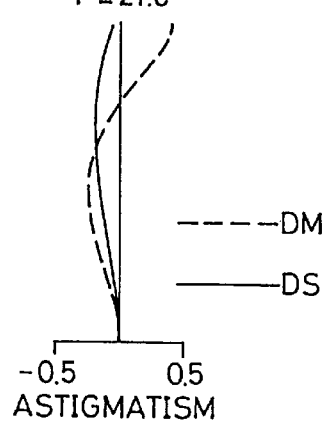
Figure 15F:
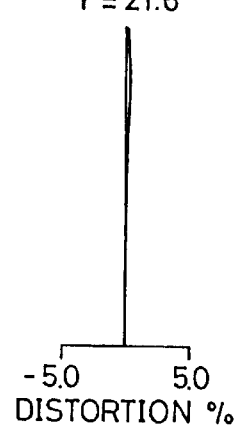
Figure 15G:
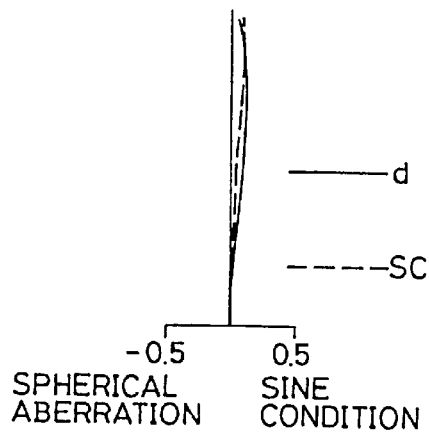
Figure 15H:
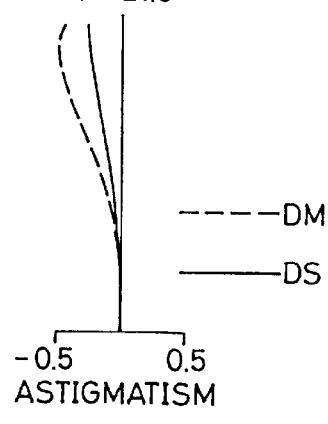
Figure 15I:
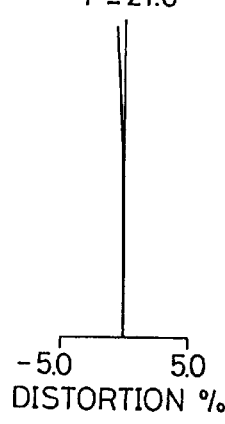
Figure 16A:
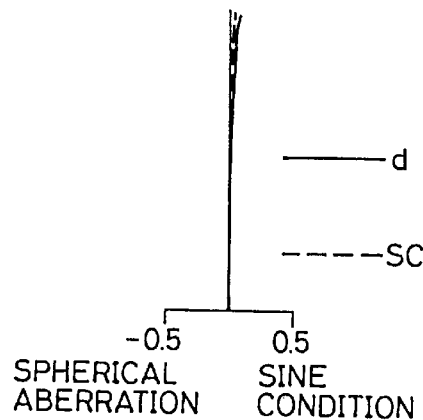
FIGS. 16A to 16I are diagrams showing aberration curves of the eighth embodiment.
Figure 16B:
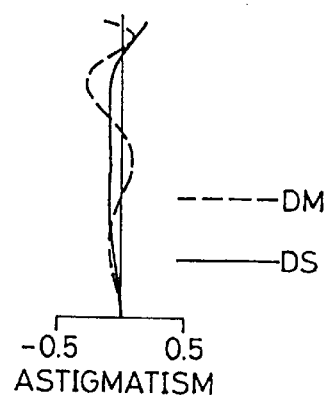
Figure 16C:
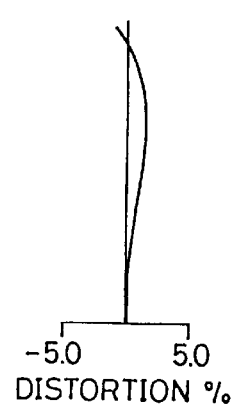
Figure 16D:
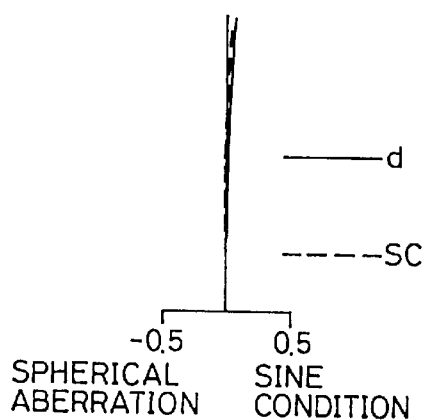
Figure 16E:
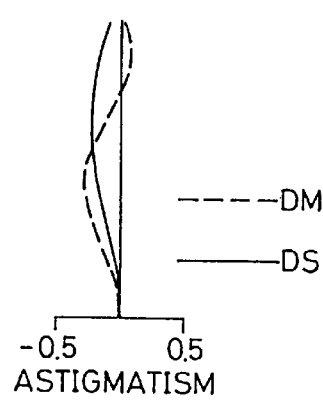
Figure 16F:
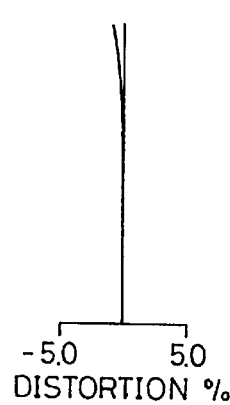
Figure 16G:
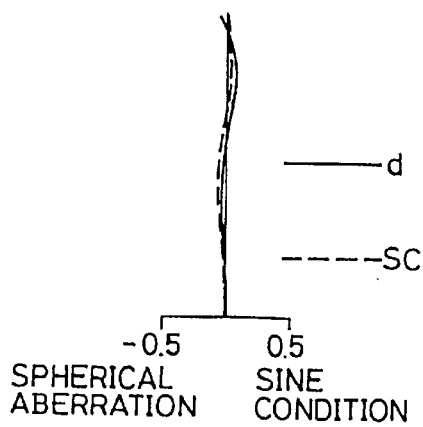
Figure 16H:
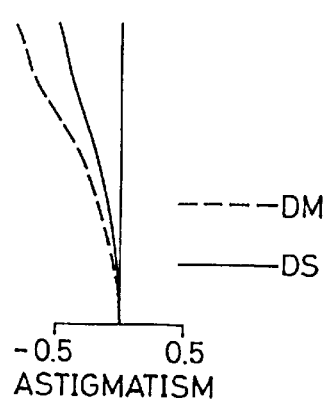
Figure 16I:
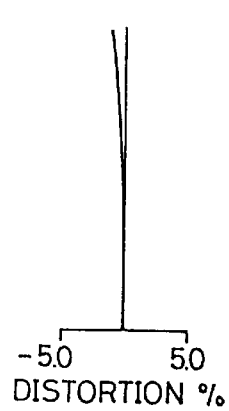

FIGS. 1 to 3 show the lens constructions corresponding to fthe embodiments 1 to 3, respectively, each showing the lens arrangement at the wide-angle end (W). In FIGS. 1 to 3, the arrows m1 and m2 schematically indicate the movement of the first and second lens units Gr1 and Gr2, respectively, from the wide-angle end (W) to the telephoto end (T).

The zoom lens systems of the embodiments 1 to 3 comprise, from the object-side end, a first lens unit Gr1 composed of a meniscus-shaped first lens L1 with its convex surface facing toward the object side (with its aspherical surface facing toward the object side), a meniscus-shaped second lens L2 having a negative refractive power with its convex surface facing toward the object side, a biconvex third lens having a positive refractive power, and an aperture diaphragm A, and a second lens unit Gr2 composed of a meniscus-shaped fourth lens having a positive refractive power with its convex surface facing toward the image side (with its aspherical surface facing toward the object side), and a meniscus-shaped fifth lens having a negative refractive power with its concave surface facing toward the object side. Of these lenses, the first lens L1 is a negative meniscus-shaped lens in the embodiments 1 and 3, and is a positive meniscus-shaped lens in the embodiment 2. In each embodiment, the first lens L1 and the fourth lens L4 are plastic lenses.

In the zoom lens systems of the embodiments 1 to 3, the first lens unit Gr1 is composed of, from the object-side end, a first lens L1 that does not have a strong refractive effect on the light rays passing through it, a second lens L2 having a negative refractive power, and a third lens having a positive refractive power. Owing to such construction, the arrangement of refractive powers over the whole system becomes analogous to that of a retrofocus lens, making available a sufficient lens-back at the wide-angle end. Consequently, the outer diameter of the second lens unit Gr2 can be made smaller, and the whole system can be made more compact. In addition, if a negative lens is used as the first lens having a weak refractive power, the construction becomes more analogous to the arrangement for a retrofocus lens; this is effective in securing a sufficient lens-back at the wide-angle end.

Moreover, the zoom lens systems of the embodiments 1 to 3 satisfy the following conditional expression (1):

$$0.15 < \phi1 \times T23 < 0.25 \tag{1}$$

where $\phi1$: composite refractive power of the first lens unit;

T23: air gap between the second and third lenses.

The conditional expression (1) defines a condition that needs to be satisfied by the air gap between the second and third lenses L2 and L3 in the first lens unit Gr1, and is related to correction of magnification chromatic aberration and distortion. When the lower limit of the conditional expression (1) is exceeded, the negative and positive lenses are too close to each other, and accordingly it is difficult to correct distortion. Reversely, when the upper limit of the conditional expression (1) is exceeded, the refractive power of the negative lens in the first lens unit is so strong that magnification chromatic aberration, in particular, cannot be corrected easily.

Moreover, the zoom lens systems of the embodiments 1 to 3 use as the first lens L1 of the first lens unit Gr1 a plastic lens with an aspherical surface facing toward the object side. In general, in a lens that is disposed nearest to the object side, a light ray incident on a given point on the lens surface varies its path to a greater degree according as the angle of view varies than in a lens that is disposed, for example, close to the aperture diaphragm. In addition, this light path depends on the surface shape of the lens disposed nearest to the object side. For this reason, by varying the surface shape of the lens disposed nearest to the object side, the light path can be varied greatly. Accordingly, if at least one aspherical surface is employed within the first lens L1, spherical aberration and off-axial coma aberration can be corrected effectively. Moreover, if a plastic lens is used as the aspherical first lens L1, costs can be reduced, compared to an aspherical lens made of glass.

Furthermore, the zoom lens systems of the embodiments 1 to 3 satisfy the following conditional expressions (2) and (3):

$$-0.4 < fT \times \phi L1 < 0.4 \tag{2}$$

$$-2.5 < \phi L1 \times fT^2 \times (\beta T - \beta W)/FnT + \phi L4 \times fT^2/FnT < 2.5 \tag{3}$$

where $\phi L1$: refractive power of the first lens L1;

fT: focal length of the whole system at the telephoto end (T);

$\beta T$: magnification of the second lens unit at the telephoto end (T);

$\beta W$: magnification of the second lens unit at the wide-angle end (W);

FnT: f-number at the telephoto end (T);

$\phi L4$: refractive power of the fourth lens L4.

The conditional expressions (2) and (3) define conditions that need to be satisfied when plastic lenses are used as the first lens L1 in the first lens unit Gr1 and as the fourth lens L4 in the second lens unit Gr2. These conditional expressions are related to the variation in focus position of the whole system in accordance with the temperature variation.

The conditional expression (2) defines the refractive power of the first lens L1, which is a plastic lens in the first lens unit Gr1. When the upper limit of the conditional expression (2) is exceeded, the refractive power of the first lens in the first lens unit Gr1 varies with temperature variation, with the result that the focal point of the whole system shifts greatly toward the image side, destabilizing the optical performance. Reversely, when the lower limit is exceeded, in a similar way, a variation in the refractive power of the first lens L1 causes the focal point of the whole system to shift greatly toward the object side, destabilizing the optical performance.

The conditional expression (3) defines the relations between the various parameters of the plastic lens L4 in the second lens unit Gr2 and the refractive power. When the upper limit of the conditional expression (3) is exceeded, the refractive power of the fourth lens L4 in the second lens unit Gr2 varies with temperature variation, with the result that the focus position of the whole system shifts greatly toward the image side, destabilizing the optical performance. Reversely, when the lower limit is exceeded, in a similar way, variation in the refractive power of the fourth lens L4 causes the focus position of the whole system to shift greatly toward the object side, destabilizing the optical performance.

The zoom lens systems of the embodiments 1 to 3 of the present invention satisfy the conditional expressions (1) to (3) above. In Table L4 below are shown the values corresponding to the conditional expressions (1) to (3) in each embodiment. Note that, in the table, T23 corresponds to d4.

TABLE 4

|  | Conditional Expression (1) $\phi1 \times T23$ | Conditional Expression (2) $fT \times \phi1$ | Conditional Expression (3) $\phi1 \times fT^2 \times (\beta T - \beta W)/Fnt + \phi4 \times fT^2/Fnt$ |
| --- | --- | --- | --- |
| Embodiment 1 | 0.162 | −0.069 | 0.77 |
| Embodiment 2 | 0.228 | 0.034 | −0.12 |
| Embodiment 3 | 0.174 | −0.624 | −2.02 |

FIGS. 4A to 6I are diagrams showing aberration curves corresponding to the embodiments 1 to 3, respectively. FIGS. 4A to 4C, 5A to 5C, and 6A to 6C show aberrations at the wide-angle-end focal length (at the shortest focal length), FIGS. 4D to 4F, 5D to 5F, and 6D to 6F show aberrations at the middle focal length, and FIGS. 4G to 4I, 5G to 5I, and 6G to 6I show aberrations at the telephoto-end focal length (at the longest focal length). Moreover, solid lines (d) show aberrations with d-lines, and broken lines (SC) show sine conditions. Furthermore, broken lines (DM) and solid lines (DS) show astigmatisms on the meridional image surface and on the sagittal image surface, respectively.

Hereinafter, the embodiments L4 to 8 of the present invention will be presented on Tables 5 to 9. Note that Tables 5 to 9 are described in the same manner as Tables 1 to 3.

TABLE 5

Embodiment 4
f = 35.7~46.1~68.7
Fno = 5.14~6.62~9.88

| | Curvature Radius | | Axial Surface Distance | | Refractive Index | | Abbe Number |
|---|---|---|---|---|---|---|---|
| r1 | −56.647 | | | | | | |
| | | d1 | 1.250 | N1 | 1.83350 | ν1 | 21.00 |
| r2 | −86.832 | | | | | | |
| | | d2 | 0.600 | | | | |
| r3* | 18.312 | | | | | | |
| | | d3 | 2.474 | N2 | 1.58340 | ν2 | 30.23 |
| r4 | 12.934 | | | | | | |
| | | d4 | 4.969 | | | | |
| r5 | 45.051 | | | | | | |
| | | d5 | 2.858 | N3 | 1.48749 | ν3 | 70.44 |
| r6 | −10.814 | | | | | | |
| | | d6 | 2.051 | | | | |
| r7 | ∞ (aperture) | | | | | | |
| | | d7 | 9.071~5.806~2.077 | | | | |
| r8* | −25.517 | | | | | | |
| | | d8 | 2.405 | N4 | 1.58340 | ν4 | 30.23 |
| r9 | −17.825 | | | | | | |
| | | d9 | 4.595 | | | | |
| r10 | −9.101 | | | | | | |
| | | d10 | 1.000 | N5 | 1.74400 | ν5 | 44.93 |
| r11 | −31.046 | | | | | | |

Aspherical Coefficient r3
$\epsilon$ = 0.10000 × 10
A4 = −0.15829 × 10E-3
A6 = −0.14263 × 10E-5
A8 = −0.18713 × 10E-7
A10 = −0.11403 × 10E-9
A12 = 0.30998 × 10E-11 r8
$\epsilon$ = 0.10000 × 10
A4 = 0.73390 × 10E-4
A6 = 0.22545 × 10E-5
A8 = 9.10174 × 10E-6
A10 = −0.25522 × 10E-8
A12 = 0.20689 × 10E-10

TABLE 6

Embodiment 5
f = 35.5~46.0~66.0
Fno = 5.05~6.55~9.39

| | Curvature Radius | | Axial Surface Distance | | Refractive Index | | Abbe Number |
|---|---|---|---|---|---|---|---|
| r1 | −33.376 | | | | | | |
| | | d1 | 1.250 | N1 | 1.83350 | ν1 | 21.00 |
| r2 | −33.944 | | | | | | |
| | | d2 | 0.600 | | | | |
| r3* | 22.943 | | | | | | |
| | | d3 | 2.329 | N2 | 1.58340 | ν2 | 30.23 |
| r4 | 15.004 | | | | | | |
| | | d4 | 5.000 | | | | |
| r5 | 54.517 | | | | | | |
| | | d5 | 3.000 | N3 | 1.49310 | ν3 | 83.58 |
| r6 | −11.220 | | | | | | |
| | | d6 | 2.051 | | | | |
| r7 | ∞ (aperture) | | | | | | |
| | | d7 | 9.202~5.651~2.012 | | | | |
| r8* | −22.257 | | | | | | |
| | | d8 | 3.000 | N4 | 1.58340 | ν4 | 30.23 |
| r9 | −16.456 | | | | | | |
| | | d9 | 3.786 | | | | |
| r10 | −8.172 | | | | | | |
| | | d10 | 1.000 | N5 | 1.74400 | ν5 | 44.90 |
| r11 | −20.205 | | | | | | |

Aspherical Coefficient r3
$\epsilon$ = 0.10000 × 10
A4 = −0.15254 × 10E-3
A6 = −0.17824 × 10E-5
A8 = 0.70671 × 10E-7
A10 = −0.36621 × 10E-8
A12 = 0.53340 × 10E-10 r8
$\epsilon$ = 0.10000 × 10
A4 = 0.15626 × 10E-3
A6 = −0.22856 × 10E-5
A8 = 0.16229 × 10E-6
A10 = −0.29959 × 10E-8
A12 = 0.23499 × 10E-10

TABLE 7

Embodiment 6
f = 35.7~46.0~68.6
Fno = 4.99~6.42~9.58

| | Curvature Radius | | Axial Surface Distance | | Refractive Index | | Abbe Number |
|---|---|---|---|---|---|---|---|
| r1* | 17.377 | | | | | | |
| | | d1 | 1.600 | N1 | 1.58340 | ν1 | 30.23 |
| r2 | 12.367 | | | | | | |
| | | d2 | 6.000 | | | | |
| r3 | 57.013 | | | | | | |
| | | d3 | 3.000 | N2 | 1.49310 | ν2 | 83.58 |
| r4 | −11.228 | | | | | | |
| | | d4 | 2.051 | | | | |
| r5 | ∞ (aperture) | | | | | | |
| | | d5 | 9.204~5.751~2.000 | | | | |
| r6* | −22.653 | | | | | | |
| | | d6 | 3.000 | N3 | 1.58340 | ν3 | 30.23 |
| r7 | −16.648 | | | | | | |
| | | d7 | 3.953 | | | | |
| r8 | −8.309 | | | | | | |
| | | d8 | 1.000 | N4 | 1.74400 | ν4 | 44.90 |
| r9 | −21.354 | | | | | | |

Aspherical Coefficient r1
$\epsilon$ = 0.10000 × 10
A4 = −0.15730 × 10E-3
A6 = −0.49544 × 10E-6
A8 = −0.40290 × 10E-7
A10 = 0.18305 × 10E-9
A12 = 0.20862 × 10E-11 r8
$\epsilon$ = 0.10000 × 10
A4 = 0.14685 × 10E-3
A6 = −0.23810 × 10E-5
A8 = 0.15384 × 10E-6

TABLE 7-continued

| | |
|---|---|
| A10 = | $-0.27695 \times 10E-8$ |
| A12 = | $0.21005 \times 10E-10$ |

TABLE 8

Embodiment 7
f = 35.7~46.0~66.9
Fno = 5.04~6.50~9.45

| Curvature Radius | | Axial Surface Distance | Refractive Index | | Abbe Number | |
|---|---|---|---|---|---|---|
| r1* | 26.709 | | | | | |
| | | d1 | 2.016 | N1 1.58340 | v1 | 30.23 |
| r2 | 14.987 | | | | | |
| | | d2 | 4.500 | | | |
| r3 | 57.457 | | | | | |
| | | d3 | 4.331 | N2 1.48749 | v2 | 70.44 |
| r4 | -10.977 | | | | | |
| | | d4 | 2.051 | | | |
| r5 | ∞ (aperture) | | | | | |
| | | d5 | 11.521~7.413~2.960 | | | |
| r6* | -25.622 | | | | | |
| | | d6 | 3.000 | N3 1.58340 | v3 | 30.23 |
| r7 | -15.175 | | | | | |
| | | d7 | 3.250 | | | |
| r8 | -8.999 | | | | | |
| | | d8 | 1.000 | N4 1.70154 | v4 | 41.15 |
| r9 | -33.232 | | | | | |

Aspherical Coefficient r1
$\epsilon = 0.10000 \times 10$
$A4 = -0.16777 \times 10E-3$
$A6 = -0.32082 \times 10E-6$
$A8 = -0.48004 \times 10E-7$
$A10 = 0.65184 \times 10E-9$
$A12 = -0.26099 \times 10E-11$ r8
$\epsilon = 0.10000 \times 10$
$A4 = 0.10856 \times 10E-3$
$A6 = -0.14254 \times 10E-5$
$A8 = 0.78421 \times 10E-7$
$A10 = -0.11772 \times 10E-8$
$A12 = 0.78719 \times 10E-11$

TABLE 9

Embodiment 8
f = 34.8~44.9~64.0
Fno = 5.05~6.55~9.39

| Curvature Radius | Axial Surface Distance | Refractive Index | Abbe Number |
|---|---|---|---|
| r1 -34.500 | | | |
| | d1 1.250 | N1 1.83350 | v1 21.00 |
| r2 -34.490 | | | |
| | d2 0.600 | | |
| r3* 22.943 | | | |
| | d3 2.329 | N2 1.58340 | v2 30.23 |
| r4 15.004 | | | |
| | d4 5.000 | | |
| r5 54.517 | | | |
| | d5 3.000 | N3 1.49310 | v3 83.58 |
| r6 -11.220 | | | |
| | d6 2.051 | | |
| r7 ∞(aperture) | | | |
| | d7 9.202~5.651~2.012 | | |
| r8* -22.257 | | | |
| | d8 3.000 | N4 1.58340 | v4 30.23 |

TABLE 9-continued

Embodiment 8

| | | | |
|---|---|---|---|
| r9 -16.456 | | | |
| | d9 3.786 | | |
| r10 -8.172 | | | |
| | d10 1.000 | N5 1.74400 | v5 44.90 |
| r11 -20.205 | | | |

Aspherical Coefficient r3
$\epsilon = 0.10000 \times 10$
$A4 = -0.15254 \times 10E-3$
$A6 = -0.17824 \times 10E-5$
$A8 = 0.70671 \times 10E-7$
$A10 = -0.36621 \times 10E-8$
$A12 = 0.53340 \times 10E-10$ r8
$\epsilon = 0.10000 \times 10$
$A4 = 0.15626 \times 10E-3$
$A6 = -0.22856 \times 10E-5$
$A8 = 0.16229 \times 10E-6$
$A10 = -0.29959 \times 10E-8$
$A12 = 0.23499 \times 10E-10$ FIGS. 7 to 11 show the lens constructions corresponding to the embodiments 4 to 8, respectively, each showing the lens arrangement at the wide-angle end (W). In FIGS. 7 to 11, the arrows m1 and m2 schematically indicate the movement of the first and second lens units Gr1 and Gr2, respectively, from the wide-angle end (W) to the telephoto end (T).

The zoom lens systems of the embodiments 4 to 8 comprise, from the object-side end, a first lens unit Gr1 having a positive refractive power and a second lens unit Gr2 having a negative refractive power.

In the embodiments 4, 5, and 8, the first lens unit Gr1 comprises, from the object-side end, a meniscus-shaped first lens L1 with its concave surface facing toward the object side, a negative meniscus-shaped second lens L2 with its convex surface facing toward the object side (with its aspherical surface facing toward the object side), a biconvex third lens L3 having a positive refractive power, and an aperture diaphragm A. Of these lenses, the first lens L1 has a negative refractive power in the embodiment 4, has a weak negative refractive power in the embodiment 5, and has a weak positive refractive power in the embodiment 8.

In the embodiment 4, 5, and 8, the second lens unit Gr2 comprises, from the object-side end, a positive meniscus-shaped fourth lens L4 with its convex surface facing toward the object-side (with its aspherical surface facing toward the object side), and a negative meniscus-shaped fifth lens L5 with its concave surface facing toward the object side.

In the zoom lens systems of the embodiments 4, 5, and 8, out of the above-mentioned lenses, the second lens L2 and the fourth lens L4 are plastic lenses.

In the embodiments 6 and 7, the first lens unit Gr1 comprises, from the object-side end, a negative meniscus-shaped first lens L1 with its convex surface facing toward the object side (with its aspherical surface facing toward the object side), a biconvex second lens L2 having a positive refractive power, and an aperture diaphragm A.

In the embodiment 6 and 7, the second lens unit Gr2 comprises, from the object-side end, a positive meniscus-shaped third lens L3 with its convex surface facing toward the object-side (with its aspherical surface facing toward the object side), and a negative meniscus-shaped fourth lens L4 with its concave surface facing toward the object side.

In the zoom lens systems of the embodiments 6 and 7, out of the above-mentioned lenses, the first lens L1 and the third lens L3 are plastic lenses.

In Table 10 below are shown the values of refractive power of each single lens in the embodiments 4 to 8. As seen from the table, the absolute values of the first lens L1 in the embodiments 5 and 8 are less than approximately one tenth of the absolute values of the second to fifth lenses L2 to L5 in the embodiments 5 and 8.

TABLE 10

|  | Embodi-ment 4 | Embodi-ment 5 | Embodi-ment 6 | Embodi-ment 7 | Embodi-ment 8 |
| --- | --- | --- | --- | --- | --- |
| 1st Lens | −0.0050 | −0.0000 | −0.0120 | −0.0160 | 0.0004 |
| 2nd Lens | −0.0110 | −0.0120 | 0.0518 | 0.0518 | −0.0120 |
| 3rd Lens | 0.0550 | 0.0522 | 0.0110 | 0.0173 | 0.0522 |
| 4th Lens | 0.0110 | 0.0110 | −0.0529 | −0.0559 | 0.0110 |
| 5th Lens | −0.0567 | −0.0523 | — | — | −0.0523 |

The zoom lens systems of the embodiments 4 to 8 of the present invention satisfy the conditional expressions (4) to (7), which are described later. In Table 11 below are shown the values corresponding to the conditional expressions (4) to (7) in each embodiment. Note that, in Table 11, T corresponds to d4 for the embodiments 4, 5, and 8, and corresponds to d2 for the embodiments 6 and 7.

TABLE 11

|  | Conditional Expression (4) $\phi Lp1/\phi1$ | Conditional Expression (5) $\phi Lp2/\phi1$ | Conditional Expression (6) $\phi Lp1 \times fT^2 \times (\beta T - \beta W)/FnT + \phi Lp2 \times fT^2/FnT$ | Conditional Expression (7) $\phi1 \times T$ |
| --- | --- | --- | --- | --- |
| Embodiment 4 | −0.26 | 0.26 | −2.16 | 0.212 |
| Embodiment 5 | −0.28 | 0.26 | −2.22 | 0.215 |
| Embodiment 6 | −0.28 | 0.26 | −2.47 | 0.257 |
| Embodiment 7 | −0.40 | 0.43 | −1.30 | 0.180 |
| Embodiment 8 | −0.28 | 0.25 | −1.82 | 0.217 |

The conditional expressions will be described below.

$$-0.6<\phi Lp1/\phi1<-0.2 \quad (4)$$

$$0.2<\phi Lp2/\phi1<0.6 \quad (5)$$

$$-2.5<\phi Lp1\times fT^2\times(\beta T-\beta W)/FnT+\phi Lp2\times fT^2/FnT<2.5 \quad (6)$$

where $\phi Lp1$: refractive power of the plastic lens in the first lens unit;

$\phi Lp2$: refractive power of the plastic lens in the second lens unit;

$\phi1$: composite refractive power of the first lens unit;

fT: focal length of the whole system at the telephoto end;

βT: magnification of the second lens unit at the telephoto end;

βW: magnification of the second lens unit at the wide-angle end;

FnT: f-number at the telephoto end.

The conditional expression (4) to (6) show conditions that need to be satisfied by a two-lens-group zoom lens system in which each lens unit includes at least one plastic lens. By finding values satisfying these conditional expressions simultaneously, the refractive power of a plastic lens can be determined properly. This makes it possible to correct aberration properly and to reduce variation in focal point of the whole zoom lens system due to temperature variation, thereby achieving stable image forming performance.

The conditional expression (4) defines the refractive power of the plastic lens in the first lens unit Gr1. When the upper limit of the conditional expression (4) is exceeded, an axial chromatic aberration is so great that it cannot be corrected easily. Reversely, when the lower limit of the conditional expression (4) is exceeded, the refractive power of the plastic lens in the first lens unit Gr1 varies with temperature variation, with the result that the focal point of the whole system varies greatly, making the optical performance of the whole system unstable against temperature variation.

The conditional expression (5) defines the refractive power of the plastic lens in the second lens unit Gr2. When the lower limit of the conditional expression (5) is exceeded, an axial chromatic aberration is so great that it cannot be corrected easily. Reversely, when the upper limit of the conditional expression (5) is exceeded, the refractive power of the plastic lens in the second lens unit Gr2 varies with temperature variation, with the result that the focal point of the whole system varies greatly, making the optical performance of the whole system unstable against temperature variation.

The conditional expression (6) defines the relation between the refractive powers of the plastic lenses in the first and second lens units Gr1 and Gr2. When the upper limit of the conditional expression (6) is exceeded, the refractive powers of the plastic lenses included in the whole zoom lens system vary with temperature variation, with the result that the focal point of the whole system shifts greatly toward the image side, destabilizing the optical performance. Reversely, when the lower limit of the conditional expression (6) is exceeded, the focal point of the whole system shifts greatly toward the object side, destabilizing the optical performance.

$$0.15<\phi1\times T<0.26 \quad (7)$$

where $\phi1$: composite refractive power of the first lens unit;

T: air gap between the negative and positive lenses included in the first lens unit.

The conditional expression (7) defines a condition that needs to be satisfied by the air gap between the positive and negative lenses in the first lens unit Gr1, and is related to correction of magnification chromatic aberration and distortion. When the lower limit of the conditional expression (7) is exceeded, the negative and positive lenses are too close to each other, and accordingly it is difficult to correct distortion. Reversely, when the upper limit of the conditional expression (7) is exceeded, the refractive power of the negative lens in the first lens unit is so strong that magnification chromatic aberration, in particular, cannot be corrected easily.

In the zoom lens systems of the embodiments 4, 5, and 8, the first lens unit Gr1 comprises, from the object-side end, a first lens L1 having either a weak refractive power or a negative refractive power, a second lens L2 having a negative power, and a third lens L3 having a positive refractive power (hereinafter referred to as the first construction). On the other hand, in the zoom lens systems of the embodiments 6 and 7, the first lens unit Gr1 comprises, from the object-side end, a first lens L1 having a negative refractive power, and a second lens L2 having a positive refractive power (hereinafter referred to as the second construction).

If one of the two constructions described above is adopted as the construction of the first lens unit Gr1 having a positive refractive power, the arrangement of refractive powers over the whole system becomes analogous to the lens arrangement for a retrofocus lens, and accordingly a sufficient lens-back is available at the wide-angle end. Thus, the outer diameter of the second lens unit Gr2 can be made smaller, and the whole system can be made more compact.

Moreover, in the first construction, if the second lens L2 has at least one aspherical surface, spherical aberration and off-axial coma aberration can be corrected properly. In particular, if an aspherical plastic lens is used as the second lens L2 having a negative refractive power, costs can be reduced, compared to an aspherical lens made of glass. In addition, since the plastic lens is disposed between first and third lenses L1 and L3 made of glass, the plastic lens, which requires careful handling to prevent scratches and other damage, can be protected against damage from outside.

Furthermore, in a two-lens-group zoom lens system, if the single lens nearest to the object side in the first lens unit Gr1 has a concave surface facing toward the object side, inclination of the image surface can be corrected, thereby giving the zoom lens system even better optical performance.

FIGS. 12A to 16I are diagrams showing aberration curves corresponding to the embodiments 4 to 8, respectively. FIGS. 12A to 12C, 13A to 13C, 14A to 14C, 15A to 15C, and 16A to 16C show aberrations at the wide-angle-end focal length (at the shortest focal length), FIGS. 12D to 12F, 13D to 13F, 14D to 14F, 15D to 15F, and 16D to 16F show aberrations at the middle focal length, and FIGS. 12G to 12I, 13G to 13I, 14G to 14I, 15G to 15I, and 16G to 16I show aberrations at the telephoto-end focal length (at the longest focal length). Moreover, in spherical aberration diagrams, solid lines (d) show aberrations with d-lines, and broken lines (SC) show sine conditions. Furthermore, in astigmatism diagrams, broken lines (DM) and solid lines (DS) show astigmatisms on the meridional image surface and on the sagittal image surface, respectively.

Hereinafter, the embodiments 9 to 11 of the present invention will be described.

Figure 17:
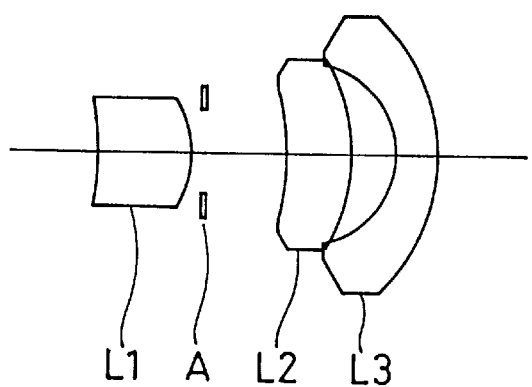
FIG. 17 is a diagram showing the lens construction of a ninth embodiment of the present invention.
Figure 17:
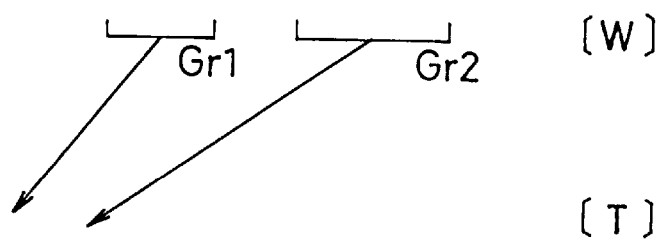
Figure 18:
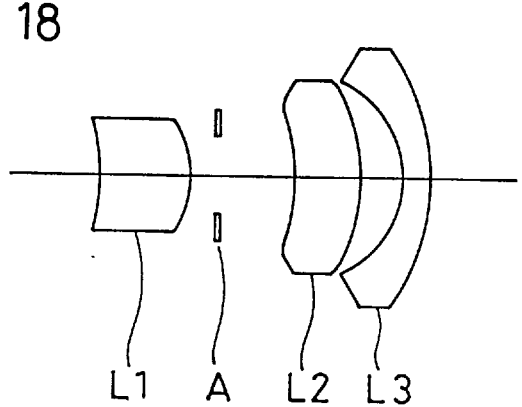
FIG. 18 is a diagram showing the lens construction of a tenth embodiment of the present invention.
Figure 18:
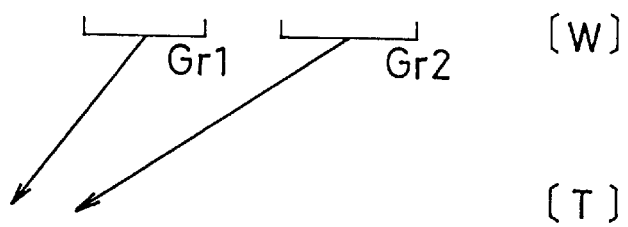
Figure 19:
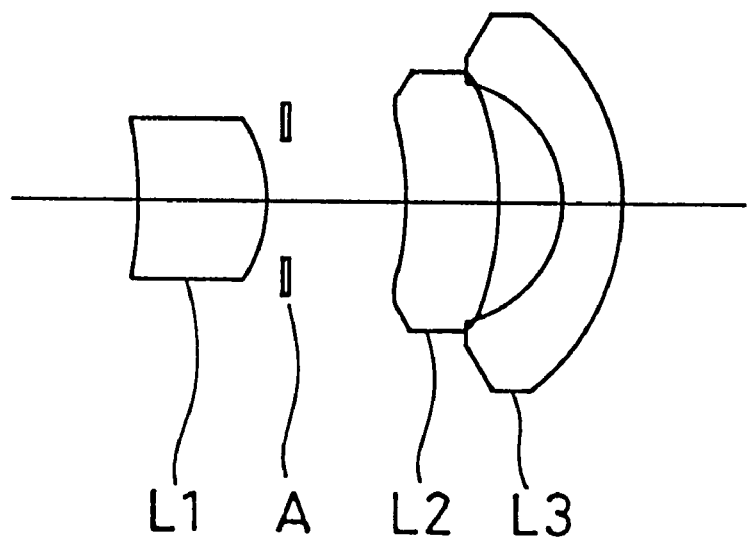
FIG. 19 is a diagram showing the lens construction of a eleventh embodiment of the present invention.
Figure 19:
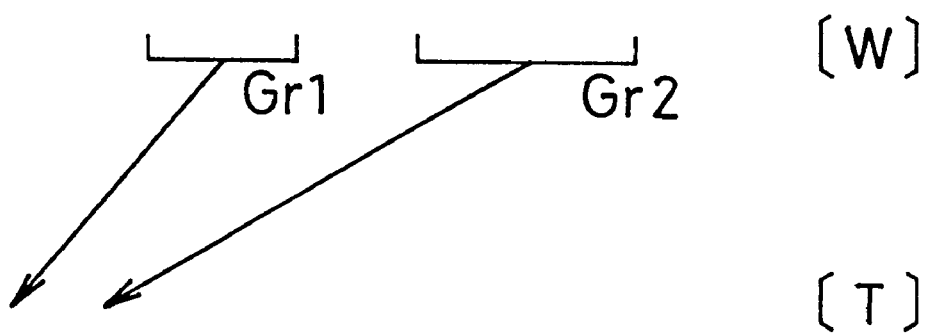
Figure 20A:
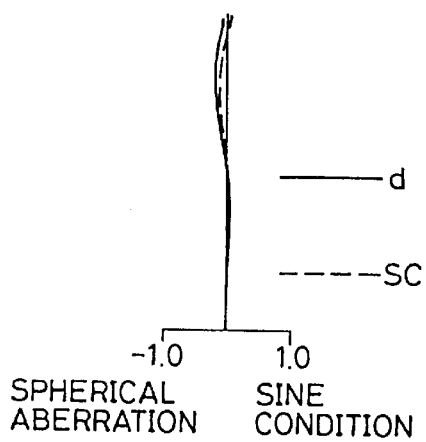
FIGS. 20A to 20I are diagrams showing aberration curves of the ninth embodiment.
Figure 20B:
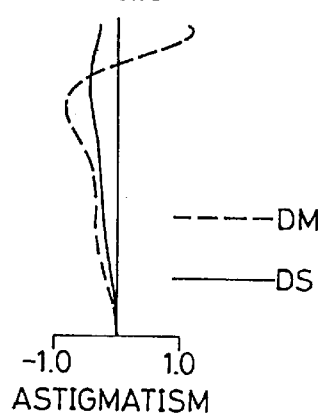
Figure 20C:
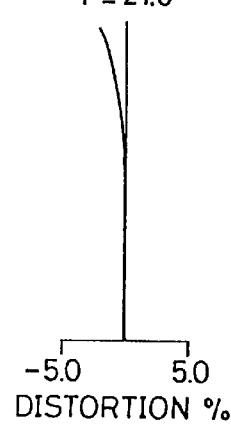
Figure 20D:
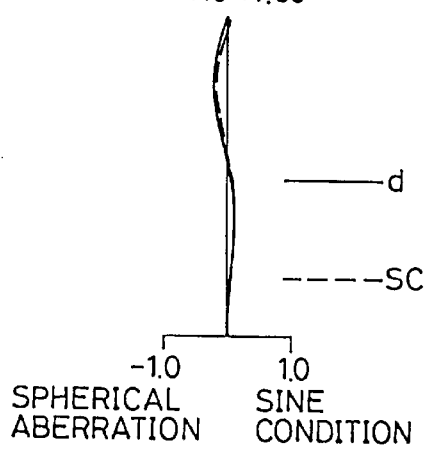
Figure 20E:
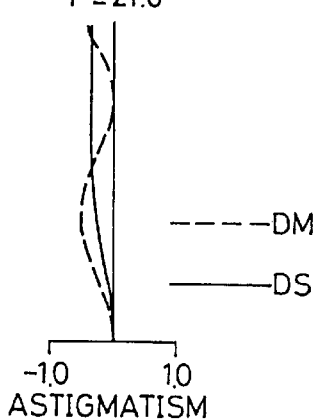
Figure 20F:
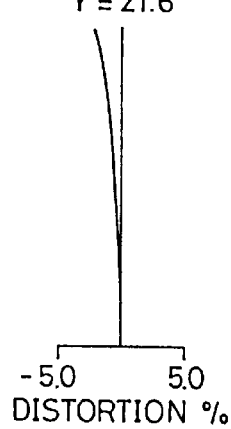
Figure 20G:
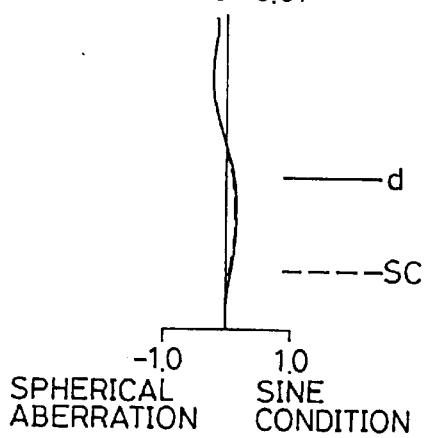
Figure 20H:
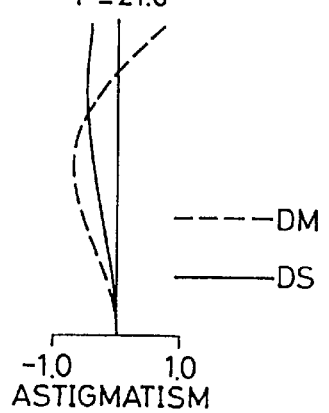
Figure 20I:
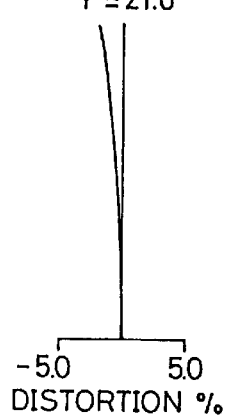
Figure 21A:
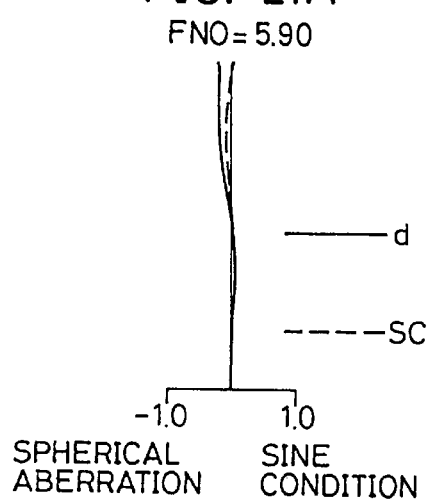
FIGS. 21A to 21I are diagrams showing aberration curves of the tenth embodiment.
Figure 21B:
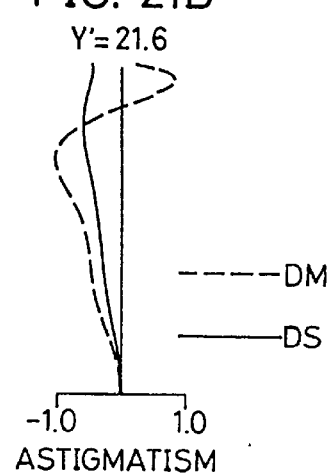
Figure 21C:
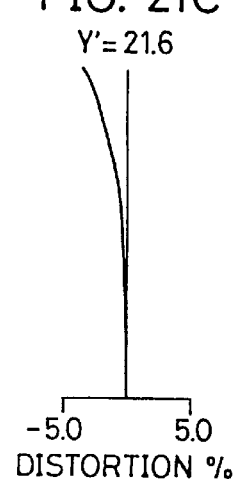
Figure 21D:
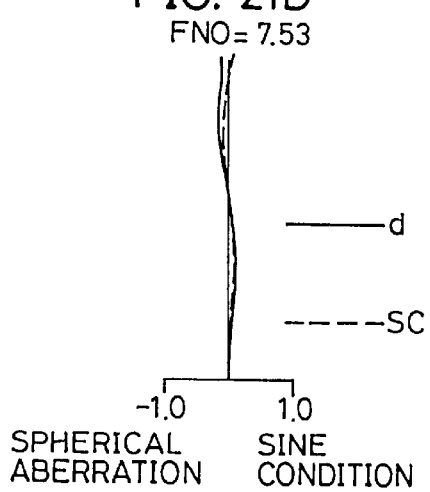
Figure 21E:
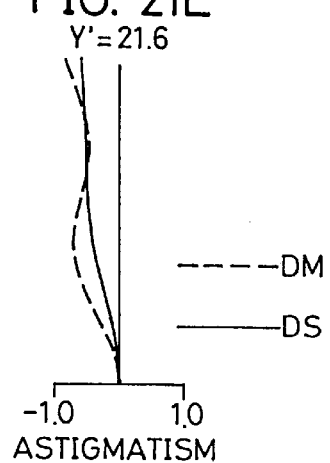
Figure 21F:
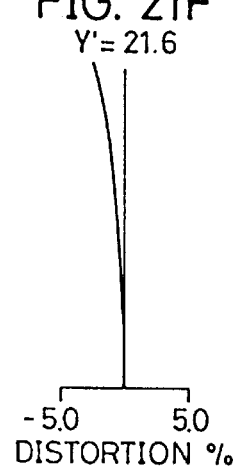
Figure 21G:
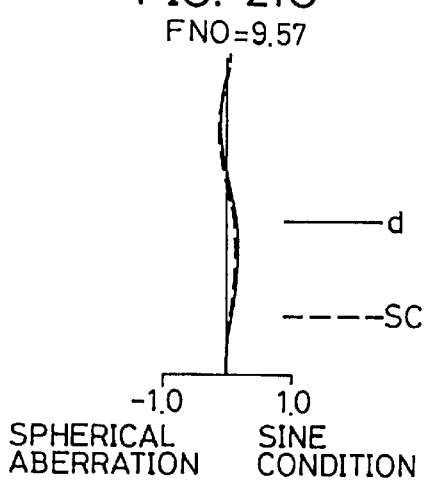
Figure 21H:
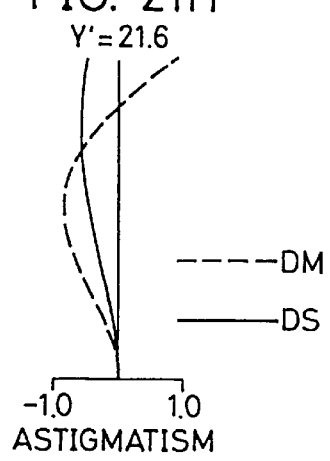
Figure 21I:
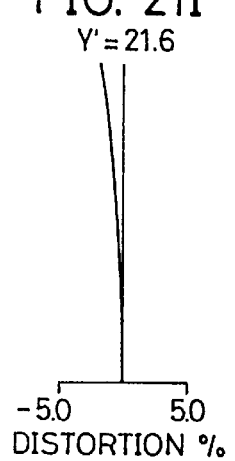
Figure 22A:
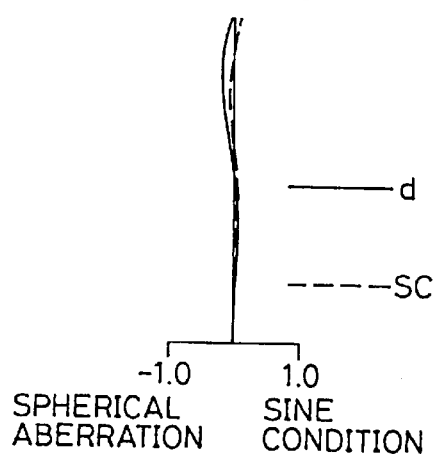
FIGS. 22A to 22I are diagrams showing aberration curves of the eleventh embodiment.
Figure 22B:
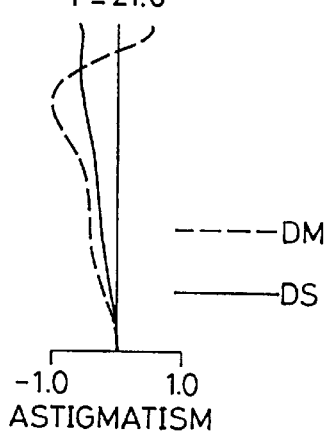
Figure 22C:
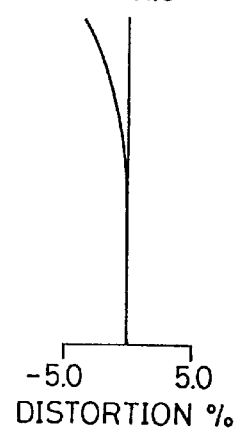
Figure 22D:
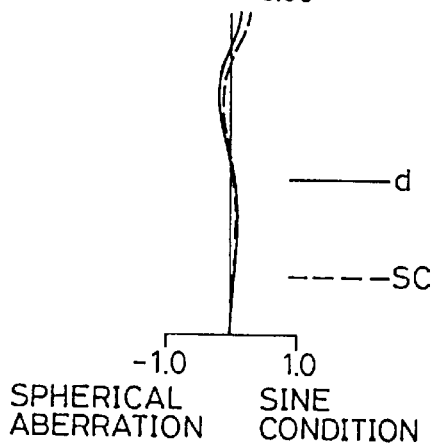
Figure 22E:
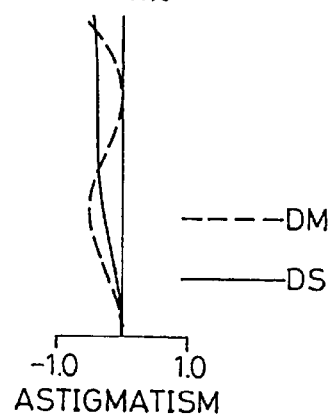
Figure 22F:
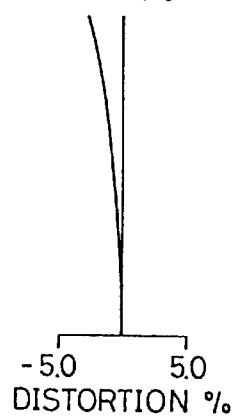
Figure 22G:
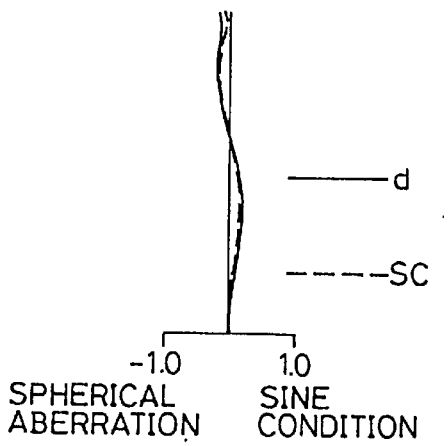
Figure 22H:
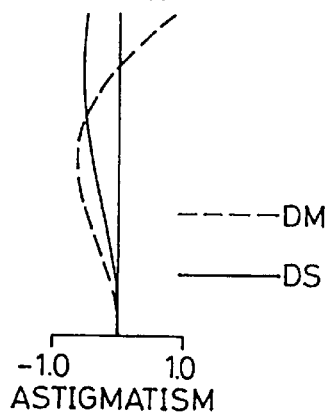
Figure 22I:
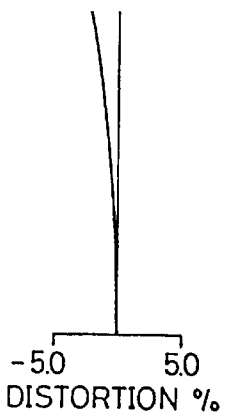

FIGS. 17 to 19 show the lens constructions of the embodiments 9 to 11, respectively, under the shortest-focal-position state. In each figure, the arrows m1 and m2 schematically indicate the movement of the first and second lens units Gr1 and Gr2, respectively, during zooming from the wide-angle end (W) to the telephoto end (T). The embodiments will be described below with reference to FIG. 17.

The zoom lens systems of these embodiments comprises, from the object side, a first lens unit Gr1 composed only of a positive meniscus lens L1 with its concave surface facing toward the object side, and a second lens unit Gr2 having a negative refractive power. The second lens unit Gr2 is composed of a negative meniscus lens L2 with its concave surface facing toward the object side, and a negative meniscus lens L3 with its concave surface facing toward the object side. Moreover, an aperture diaphragm A is disposed to the image side of the first lens unit Gr1.

During zooming from the wide-angle end (W) to the telephoto end (T), the first lens unit Gr1 and the aperture diaphragm A move toward the object side, and the second lens unit Gr2 also moves toward the object side in such a way that the distance between the first and second lens units Gr1 and Gr2 decreases.

In these embodiments, the first lens unit is composed of one lens, that is, it is composed of a minimum number of lens. On the other hand, the second lens unit is composed of two lenses, so that magnification chromatic aberration can be corrected properly by the second lens unit.

Alternatively, in a zoom lens system which comprises, from the object side, a first lens unit composed of one positive lens, and a second lens unit having a negative refractive power and which zooms from the wide-angle end to the telephoto end by decreasing the distance between the first and second lens units, if the zoom lens system satisfies the following conditional expression (8), axial chromatic aberration can be corrected properly.

$$0.9 < |\phi1/\phi2| < 1.3 \tag{8}$$

where $\phi1$: composite refractive power of the first lens unit;

$\phi2$: composite refractive power of the second lens unit.

In general, chromatic aberration in a zoom lens system is corrected within each lens unit in order to reduce effects resulting from magnification during zooming. In these embodiments, however, since the first lens unit is composed of one lens, chromatic aberration cannot be corrected within the first lens unit. For this reason, in these embodiments, chromatic aberration occurring in the first lens unit is corrected by the second lens unit, so that axial chromatic aberration of the whole system is corrected properly. More specifically, by constructing the first and second lens units so that their respective composite refractive powers will satisfy the above-mentioned conditional expression (8), axial chromatic aberration can be corrected properly. In addition, the Petzval sum can be corrected properly as well.

When the lower limit of the conditional expression (8) is exceeded, axial chromatic aberration occurring in the first lens unit cannot be corrected easily by the second lens unit. Reversely, when the upper limit of the conditional expression (8) is exceeded, the refractive power of the second lens unit is smaller relative to that of the first lens unit, with the result that the Petzval sum is so large in the positive direction over the whole zooming range that it cannot be corrected easily.

In these embodiments, the first lens unit is composed of one lens, and chromatic aberration occurring in the first lens unit is corrected by the second lens unit. For this reason, it is desirable that the following conditional expression (9) be satisfied:

$$v1 > 55 \tag{9}$$

where v1: Abbe number of the lenses of the first lens unit.

If the conditional expression (9) above is satisfied, chromatic aberration occurring in the first lens unit can be reduced to a minimum. A value below the lower limit specified by the conditional expression (9) indicates a high degree of dispersion, which makes chromatic aberration occurring in the first lens unit so great that it cannot be corrected easily by the second lens unit. Under this condition, chromatic aberration occurring in the first lens unit needs to be corrected within the first lens unit in some way, for example, by constructing the first lens unit with more than one lens.

Moreover, in a zoom lens system comprising a first lens unit composed of one positive lens, and a negative second lens unit composed of two lenses, it is desirable that the following conditional expression (10) be satisfied:

$$-3.0 < r/T < -1.7 \tag{10}$$

where r: object-side curvature radius of the image-side lens in the second lens unit;

T: air gap between the object-side and image-side lenses in the second lens unit.

When the upper limit of the conditional expression (10) is exceeded, the curvature radius of the object-side surface of the image-side lens is so small that a sufficient distance cannot be obtained between the object-side and image-side lenses, with the result that off-ax:ial light beams cannot be secured easily. Reversely, when the lower limit of the conditional expression (10) is exceeded, magnification chromatic aberration cannot be corrected easily.

Moreover, in a zoom lens system comprising a first lens unit composed of one positive lens, and a negative second lens unit composed of two lenses, it is desirable that the second lens unit be composed of a plastic lens having at least one aspherical surface and having almost no refractive power, and a lens having a negative refractive power. In this construction, magnification chromatic aberration and distortion occurring in the first lens unit can be corrected by the aspherical surface of the plastic lens. Furthermore, use of the plastic lens having almost no refractive power makes it possible to suppress shifting of the focal position caused by the plastic lens affected by temperature variation. Here, a lens having almost no refractive power refers to a lens whose refractive power $\phi p$ satisfies the following conditional expression (11):

$$0 \leq |\phi p/\phi w| < 0.2 \tag{11}$$

where $\phi w$: refractive power of the whole system at the wide-angle end.

Hereinafter, the embodiments 9 to 11 of the present invention will be presented on Tables 12 to 14. Note that Tables 12 to 14 are described in the same manner as Tables 1 to 3.

TABLE 12

Embodiment 9

$f = 36.0\sim46.0\sim58.5$
$Fno = 5.90\sim7.53\sim9.57$

| Curvature Radius | Axial Surface Distance | Refractive Index | Abbe Number |
|---|---|---|---|
| r1* −48.073 | | | |
| | d1 7.116 | N1 1.51178 | v1 69.07 |
| r2* −8.333 | | | |
| | d2 1.000 | | |
| r3 ∞(aperture) | | | |
| | d3 6.361~3.903~2.000 | | |
| r4* −16.840 | | | |
| | d4 5.000 | N2 1.62017 | v2 24.01 |
| r5* −18.754 | | | |
| | d5 3.400 | | |
| r6 −6.789 | | | |
| | d6 3.349 | N3 1.63980 | v3 34.55 |
| r7 −14.252 | | | |

Aspherical Coefficient r1

$\epsilon = 0.10000 \times 10$
$A4 = -0.50176 \times 10E-3$
$A6 = 0.66872 \times 10E-5$
$A8 = -0.11529 \times 10E-5$
$A10 = 0.23216 \times 10E-7$
$A12 = -0.20129 \times 10E-8$
$A14 = 0.17255 \times 10E-9$ r2

$\epsilon = 0.10000 \times 1$
$A4 = 0.39318 \times 10E-6$
$A6 = -0.20835 \times 10E-5$

TABLE 12-continued

Embodiment 9

$A8 = 0.31160 \times 10E-6$
$A10 = -0.15213 \times 10E-7$
$A12 = -0.51514 \times 10E-9$
$A14 = 0.46299 \times 10E-10$ r4

$\epsilon = 0.10000 \times 10$
$A4 = 0.17577 \times 10E-3$
$A6 = 0.15346 \times 10E-6$
$A8 = 0.20743 \times 10E-6$
$A10 = -0.14592 \times 10E-8$
$A12 = -0.14056 \times 10E-9$
$A14 = 0.22878 \times 10E-11$
$A16 = 0.60774 \times 10E-13$ r5

$\epsilon = 0.10000 \times 1$
$A4 = -0.97056 \times 10E-4$
$A6 = 0.39243 \times 10E-5$
$A8 = -0.19724 \times 10E-6$
$A10 = 0.19476 \times 10E-8$
$A12 = 0.49383 \times 10E-10$
$A14 = -0.10674 \times 10E-11$

TABLE 13

Embodiment 10

$f = 36.0\sim46.0\sim58.5$
$Fno = 5.90\sim7.53\sim9.57$

| Curvature Radius | Axial Surface Distance | Refractive Index | Abbe Number |
|---|---|---|---|
| r1* −29.846 | | | |
| | d1 7.116 | N1 1.49310 | v1 83.58 |
| r2* −7.534 | | | |
| | d2 2.000 | | |
| r3 ∞(aperture) | | | |
| | d3 5.901~3.702~2.000 | | |
| r4* −15.132 | | | |
| | d4 5.000 | N2 1.62017 | v2 24.01 |
| r5* −17.046 | | | |
| | d5 3.400 | | |
| r6 −8.000 | | | |
| | d6 2.000 | N3 1.70154 | v3 41.15 |
| r7 −18.036 | | | |

Aspherical Coefficient r1

$\epsilon = 0.10000 \times 10$
$A4 = -0.61174 \times 10E-3$
$A6 = 0.72822 \times 10E-5$
$A8 = -0.11517 \times 10E-5$
$A10 = 0.23230 \times 10E-7$
$A12 = -0.20122 \times 10E-8$
$A14 = 0.17255 \times 10E-9$ r2

$\epsilon = 0.10000 \times 1$
$A4 = 0.40939 \times 10E-4$
$A6 = 0.52954 \times 10E-5$
$A8 = 0.27879 \times 10E-6$
$A10 = -0.15253 \times 10E-7$
$A12 = -0.51615 \times 10E-9$
$A14 = 0.46304 \times 10E-10$ r4

$\epsilon = 0.10000 \times 10$
$A4 = 0.16688 \times 10E-3$
$A6 = -0.12012 \times 10E-5$
$A8 = 0.18079 \times 10E-6$ TABLE 13-continued Embodiment 10

A10 = −0.18493 × 10E-8
A12 = −0.17535 × 10E-9
A14 = 0.21460 × 10E-11
A16 = 0.60774 × 10E-13 r5

ε = 0.10000 × 1
A4 = −0.71254 × 10E-4
A6 = 0.39805 × 10E-5
A8 = −0.19094 × 10E-6
A10 = 0.19794 × 10E-8
A12 = 0.49707 × 10E-10
A14 = −0.99695 × 10E-11

TABLE 14

Embodiment 11 f = 36.0~46.0~58.5
Fno = 5.90~6.99~9.31

| Curvature Radius | Axial Surface Distance | Refractive Index | Abbe Number |
|---|---|---|---|
| r1* −48.073 | | | |
| | d1 7.116 | N1 1.49300 | ν1 58.34 |
| r2* −8.067 | | | |
| | d2 1.000 | | |
| r3 ∞(aperture) | | | |
| | d3 6.492~3.960~2.000 | | |
| r4* −17.119 | | | |
| | d4 5.000 | N2 1.62017 | ν2 24.01 |
| r5* −20.145 | | | |
| | d5 3.400 | | |
| r6 −6.688 | | | |
| | d6 3.349 | N3 1.67339 | ν3 29.25 |
| r7 −12.853 | | | |

Aspherical Coefficient r1

ε = 0.10000 × 10
A4 = −0.51911 × 10E-3
A6 = 0.72617 × 10E-5
A8 = −0.11519 × 10E-5
A10 = 0.23222 × 10E-7
A12 = −0.20128 × 10E-8
A14 = 0.17255 × 10E-9 r2

ε = 0.10000 × 1
A4 = 0.20926 × 10E-4
A6 = −0.17768 × 10E-5
A8 = 0.32896 × 10E-6
A10 = −0.15209 × 10E-7
A12 = −0.51511 × 10E-9
A14 = 0.46299 × 10E-10 r4

ε = 0.10000 × 10
A4 = 0.17544 × 10E-3
A6 = 0.50044 × 10E-6
A8 = 0.21106 × 10E-6
A10 = −0.14237 × 10E-8
A12 = −0.13854 × 10E-9
A14 = 0.22923 × 10E-11
A16 = 0.60774 × 10E-13 r5

ε = 0.10000 × 1
A4 = −0.10549 × 10E-3
A6 = 0.38992 × 10E-5
A8 = −0.19686 × 10E-6

TABLE 14-continued

Embodiment 11

A10 = 0.19360 × 10E-8
A12 = 0.47514 × 10E-10
A14 = −0.10787 × 10E-11

In any of the embodiments 9 to 11, the second lens L2, which is the object-side lens in the second lens unit Gr2, is a plastic lens and has almost no refractive power.

FIGS. 20A to 22I are diagrams showing aberration curves corresponding to the embodiments 9 to 11, respectively. FIGS. 20A to 20C, 21A to 21C, and 22A to 22C show aberrations at the wide-angle-end focal length (at the shortest focal length), FIGS. 20D to 20F, 21D to 21F, and 22D to 22F show aberrations at the middle focal length, and FIGS. 20G to 20I, 21G to 21I, and 22G to 22I show aberrations at the telephoto-end focal length (at the longest focal length). Moreover, solid lines (d) show aberrations with d-lines, and broken lines (SC) show sine conditions. Furthermore, broken lines (DM) and solid lines (DS) show astigmatisms on the meridional image surface and on the sagittal image surface, respectively.

In Table 15 below are shown the values corresponding to the conditional expressions (8) to (11) in the embodiments 9 to 11.

TABLE 15

| | Conditional Expression (8) r/T | Conditional Expression (9) ν1 | Conditional Expression (10) \|φ1/φ2\| | Conditional Expression (11) \|φp/φw\| |
|---|---|---|---|---|
| Embodiment 9 | −2.00 | 69.67 | 1.19 | 0 |
| Embodiment 10 | −2.35 | 83.58 | 1.07 | 0 |
| Embodiment 11 | −1.97 | 58.34 | 1.22 | −0.002 |

Hereinafter, the embodiments 12 to 15 of the present invention will be described.

Figure 23:
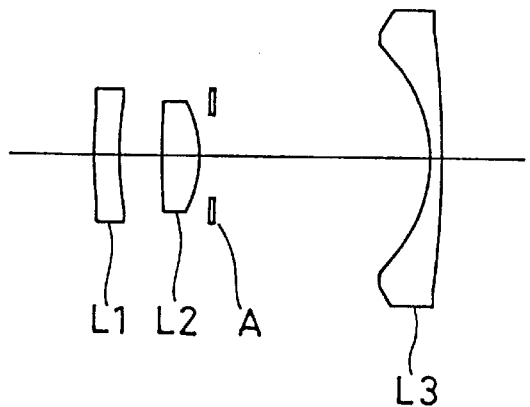
FIG. 23 is a diagram showing the lens construction of a twelfth embodiment of the present invention.
Figure 23:
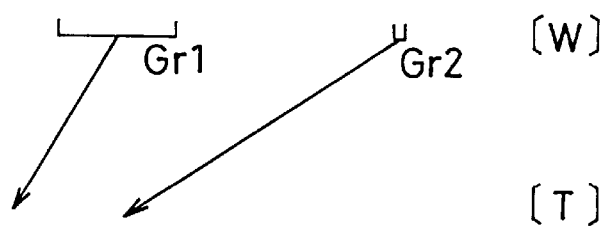
Figure 24:
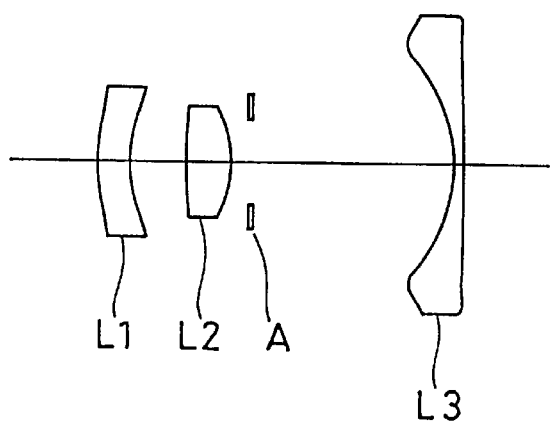
FIG. 24 is a diagram showing the lens construction of a thirteenth embodiment of the present invention.
Figure 24:
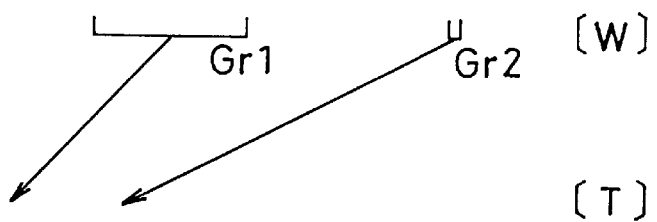
Figure 25:
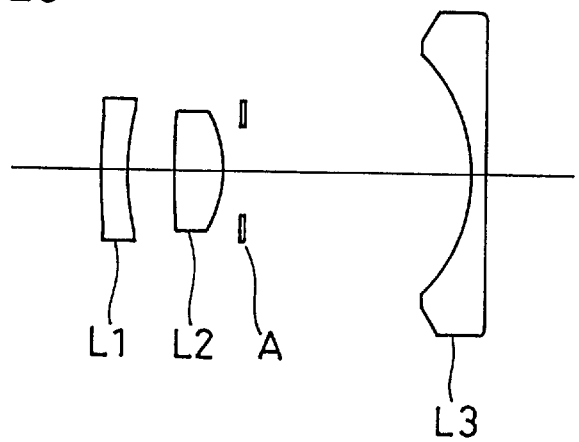
FIG. 25 is a diagram showing the lens construction of a fourteenth embodiment of the present invention.
Figure 25:
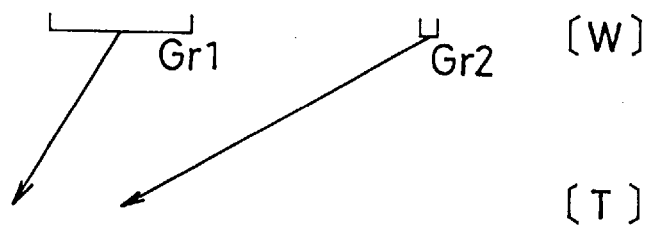
Figure 26:
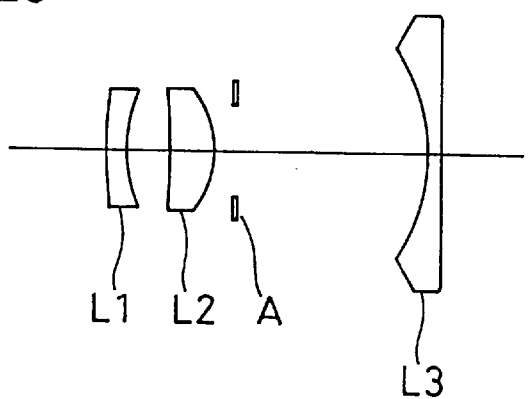
FIG. 26 is a diagram showing the lens construction of a fifteenth embodiment of the present invention.
Figure 26:
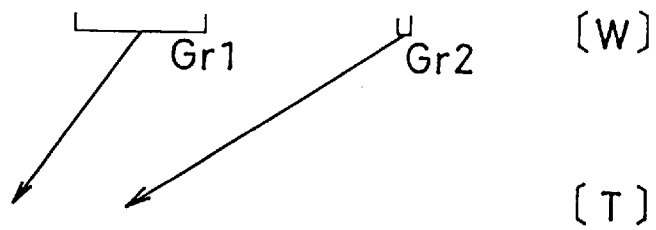
Figure 27A:
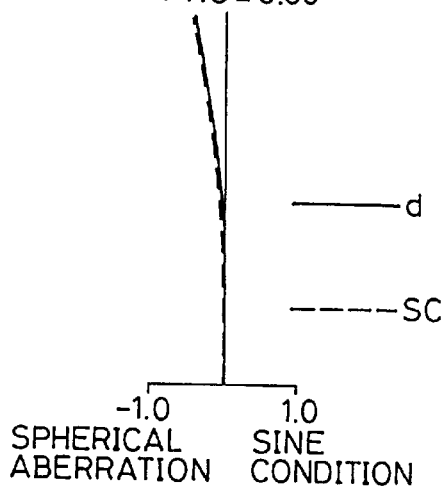
FIGS. 27A to 27I are diagrams showing aberration curves of the twelfth embodiment.
Figure 27B:
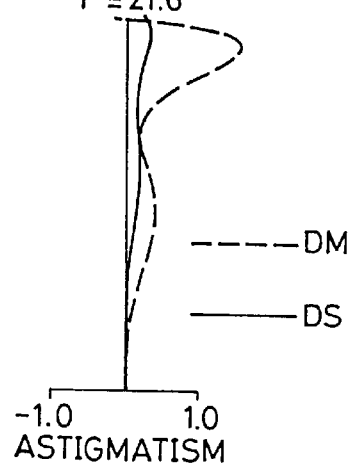
Figure 27C:
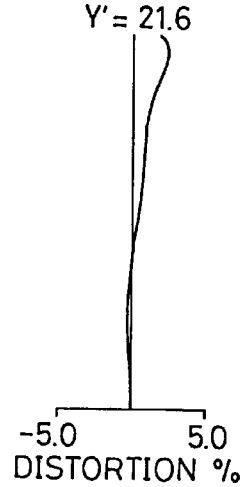
Figure 27D:
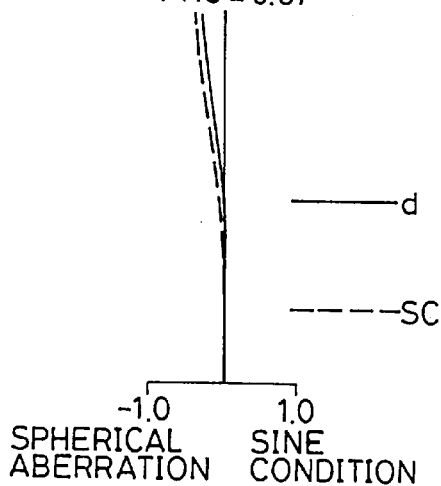
Figure 27E:
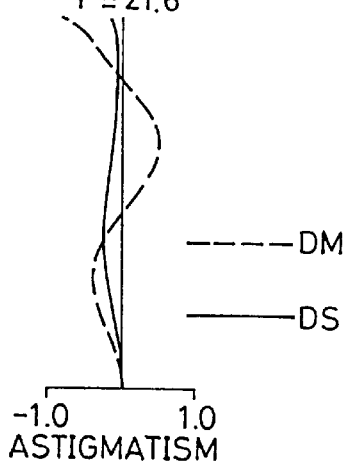
Figure 27F:
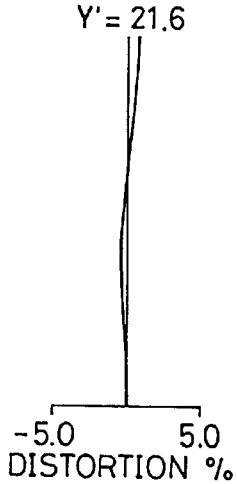
Figure 27G:
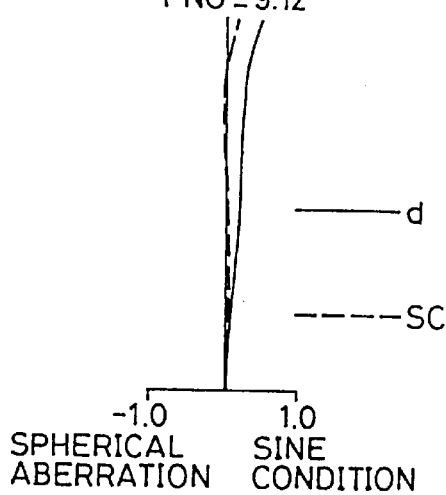
Figure 27H:
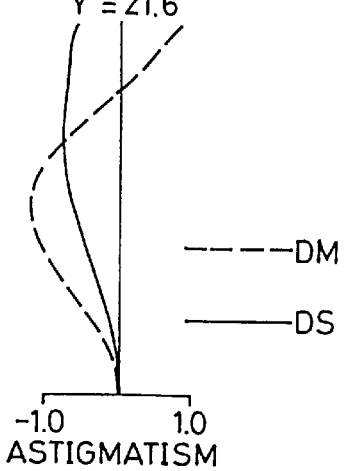
Figure 27I:
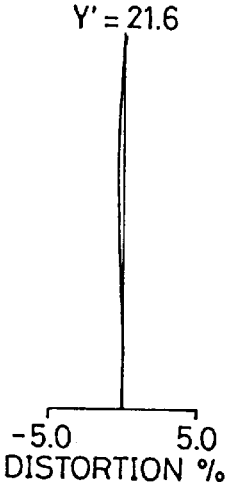
Figure 28A:
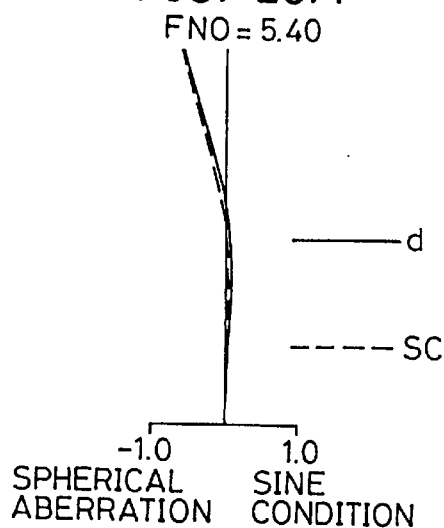
FIGS. 28A to 28I are diagrams showing aberration curves of the thirteenth embodiment.
Figure 28B:
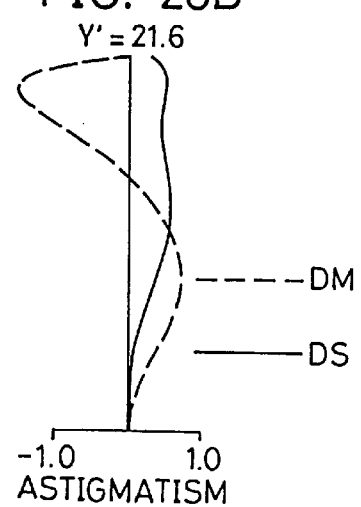
Figure 28C:
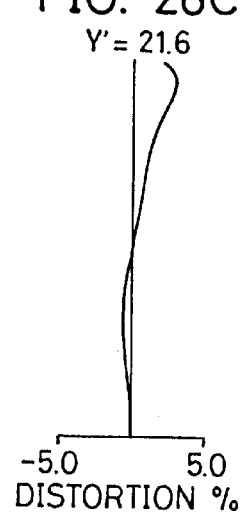
Figure 28D:
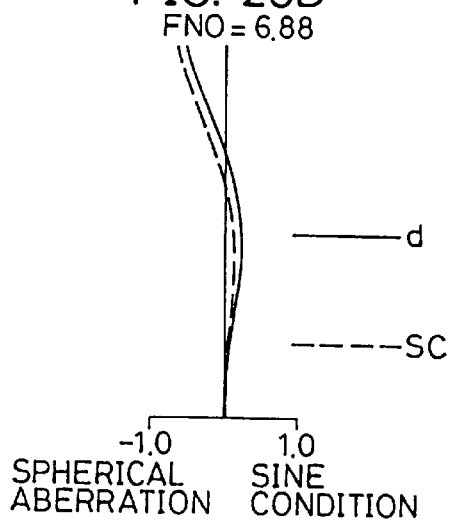
Figure 28E:
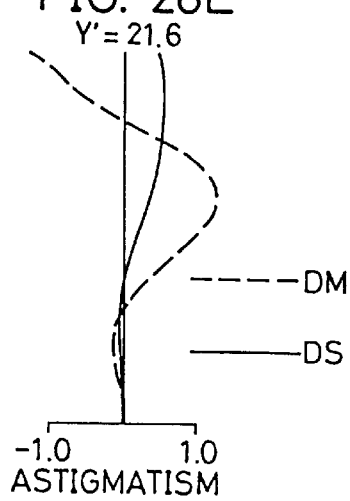
Figure 28F:
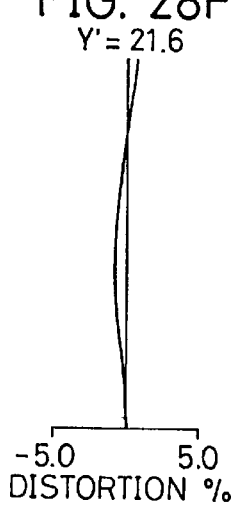
Figure 28G:
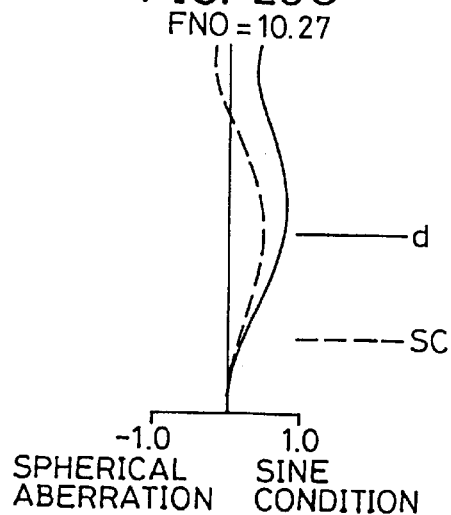
Figure 28H:
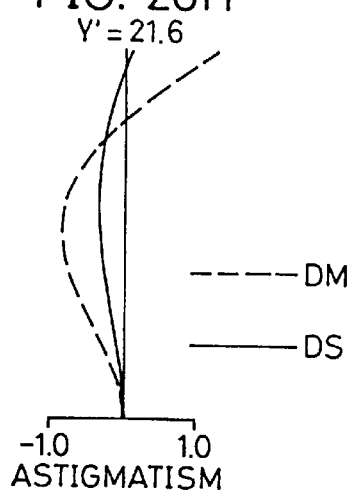
Figure 28I:
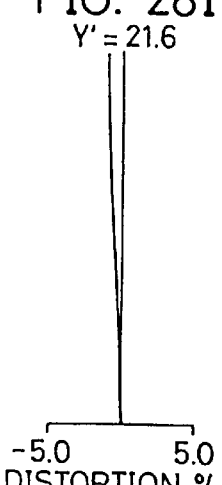
Figure 29A:
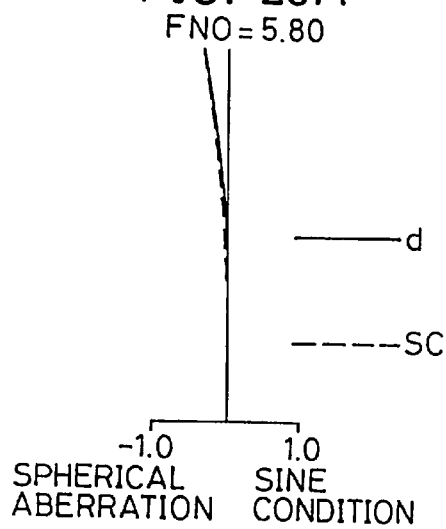
FIGS. 29A to 29I are diagrams showing aberration curves of the fourteenth embodiment.
Figure 29B:
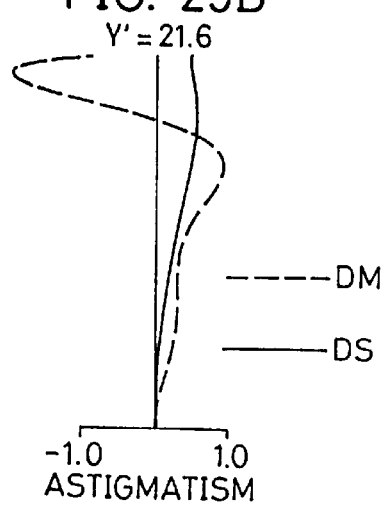
Figure 29C:
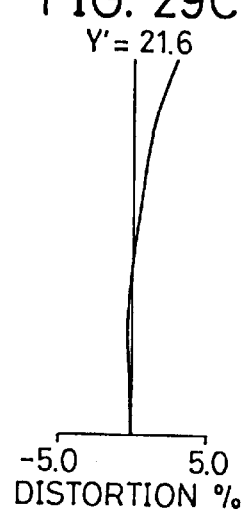
Figure 29D:
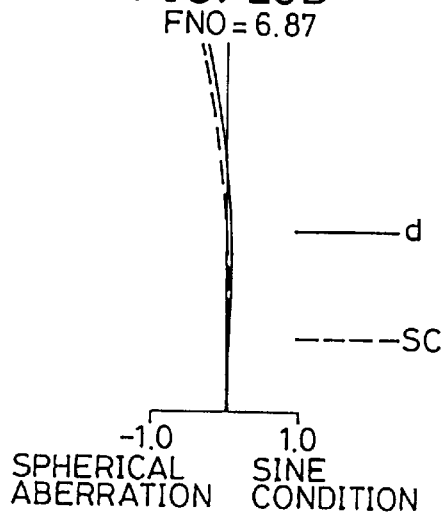
Figure 29E:
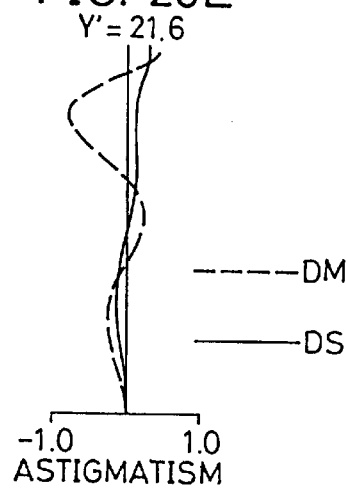
Figure 29F:
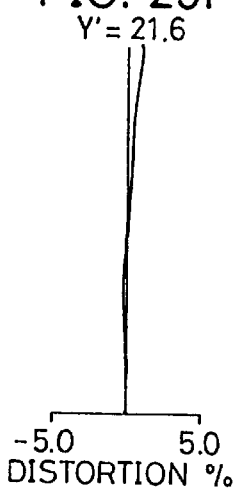
Figure 29G:
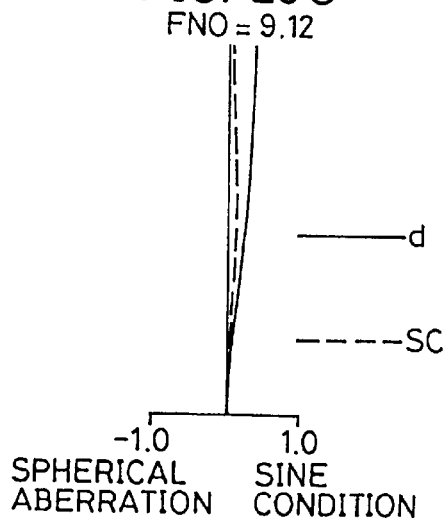
Figure 29H:
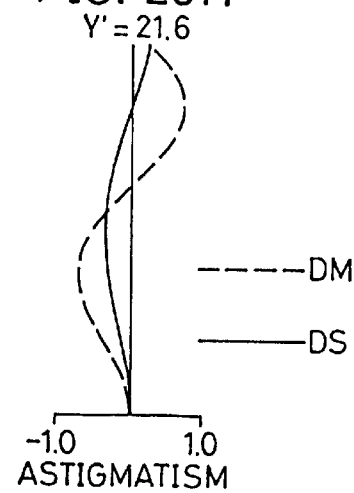
Figure 29I:
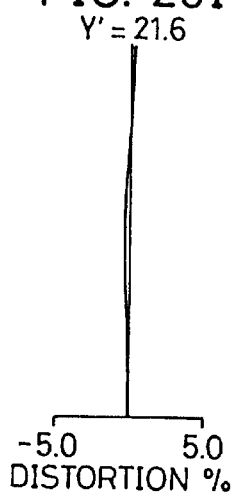

FIGS. 23 to 25 show the lens constructions of the embodiments 12 to 14, respectively, under the shortest-focal-position state. These embodiments are also referred to as a third construction. FIG. 26 shows the lens construction of the embodiment 15 under the shortest-focal-position state. This embodiment is also referred to as a fourth construction. In FIGS. 23 to 26, the arrows m1 and m2 schematically indicate the movement of the first and second lens units Gr1 and Gr2, respectively, during zooming from the wide-angle end (W) to the telephoto end (T). First, the embodiments of the third construction will be described below with reference to FIG. 23.

A zoom lens system of the first construction comprises, from the object side, a first lens unit Gr1 having a positive refractive power, and a second lens unit Gr2 composed only of a negative meniscus lens with its convex surface facing toward the image side. The first lens unit Gr1 is composed of a negative meniscus lens L1 with its convex surface facing toward the object side, and a biconvex lens L2. Moreover, an aperture diaphragm A is disposed to the image side of the first lens unit Gr1.

A zoom lens system of the fourth construction comprises, from the object side, a first lens unit Gr1 having a positive refractive power, and a second lens unit Gr2 composed only of a negative meniscus lens with its convex surface facing toward the object side. The first lens unit Gr1 is composed of a negative meniscus lens L1 with its convex surface facing toward the object side, and a positive meniscus lens L2 with its convex surface facing toward the image side. Moreover, an aperture diaphragm A is disposed to the image side of the first lens unit Gr1.

In either of the third and fourth constructions, during zooming from the wide-angle end (W) to the telephoto end (T), the first lens unit Gr1 and the aperture diaphragm A moves toward the object side, and the second lens unit Gr2 also moves toward the object side in such a way that the distance between the first and second lens units Gr1 and Gr2 decreases.

In general, chromatic aberration in a zoom lens system is corrected within each lens unit in order to reduce effects resulting from magnification during zooming. In the zoom lenses of these embodiments, since the first lens unit is composed of two lenses, chromatic aberration occurring within the first lens unit is properly corrected. Nevertheless, since the second lens unit is composed of one lens, chromatic aberration resulting from differences in refractive power and dispersion between the lenses cannot be corrected within the second lens unit. For this reason, in these embodiments, the zoom lens system is so designed that the following conditional expressions (12) and (13) are satisfied, so that, by reducing chromatic aberration occurring in the second lens unit, aberration is corrected properly.

$$N21 < 1.55 \tag{12}$$

$$\nu 21 > 55 \tag{13}$$

where

N21: d-lines refractive coefficient of the negative lens in the second lens unit;

ν21: Abbe number of the negative lens in the second lens unit.

When the upper limit of the conditional expression (12) is exceeded, the refractive power of the negative lens in the second lens unit is too strong, making the Petzval sum so large that it cannot be corrected easily. On the other hand, satisfying the conditional expression (13) means alleviating the duty of the first lens unit to correct chromatic aberration, and thus leads to reduction of the total length of the first lens unit. When the lower limit of the conditional expression (13) is exceeded, a high degree of dispersion in the negative lens of the second lens unit makes magnification chromatic aberration occurring in the second lens unit so large that it is difficult to construct the second lens unit with one lens. Magnification chromatic aberration occurring in the second lens unit may be corrected effectively by securing a larger distance between the object-side and image-side lenses in the first lens unit. A larger distance between the object-side and image-side lenses in the first lens unit, however, makes the total length of the first lens unit longer, and accordingly is not desirable in terms of compactness.

To reduce the size of a camera in the not-in-use state where its lenses are retracted, it is necessary to reduce the thickness of every lens unit in the zoom lens system. Usually, the thickness of a lens unit refers to its thickness along the optical axis; in reality, however, the thickness at its periphery also needs to be reduced. In these embodiments, the first lens unit has, at is object-side end, a convex surface facing toward the object side. As a result, the whole system forms a nearly symmetrical form, and this helps to correct distortion properly. In addition, since the periphery (edge) of the lens is positioned closer to the image side than the lens's vertex, it is possible to reduce the size of the camera in the not-in-use state. Furthermore, if the negative lens in the second lens unit has a convex surface facing toward the image side, the periphery (edge) of this lens is positioned closer to the object side than the lens's vertex, and accordingly it is possible to reduce the size of the camera in the not-in-use state.

In terms of compactness, it is preferable that a construction of these embodiments satisfy the following conditional expression (14):

$$0.35 < \Sigma T \times \phi 1 < 0.45 \tag{14}$$

where

ΣT: sum of the axial thickness of the first lens unit (that is, the distance from the object-side vertex of the object-side lens L1 to the image-side vertex of the image-side lens L2) and the axial thickness of the negative lens in the second lens unit (hereinafter referred to as the lens's total length);

φ1: composite refractive power of the first lens unit.

The conditional expression (14) above defines the ratio of the total length of the lens to the composite refractive power of the first lens unit. When the lower limit of the conditional expression (14) is exceeded, chromatic aberration occurring in the first lens unit is so great that it cannot be corrected easily. Reversely, when the upper limit of the conditional expression (14) is exceeded, the total length of the lens is so large that it impairs the compactness of the camera.

Moreover, as long as glass aspherical lenses are used, much is not expected in cost reduction; use of plastic lenses is essential for further cost reduction. In these embodiments, the first lens unit includes at least one plastic lens, and, by constructing the second lens unit with plastic lenses, costs can effectively reduced.

Furthermore, in these embodiments, it is preferable that at least one aspherical surface be included in the negative lens in the first lens unit and in the second lens unit. If the first lens unit includes at least one aspherical surface, spherical aberration occurring in the first lens unit can be corrected properly. On the other hand, if the second lens unit includes at least one aspherical surface, off-axial coma aberration and distortion can be corrected properly.

Hereinafter, the embodiments 12 to 15 of the present invention will be presented on Tables 16 to 20. Note that Tables 16 to 20 are described in the same manner as Tables 1 to 3.

TABLE 16

Embodiment 12 f = 36.0~45.9~58.5
Fno = 5.80~6.87~9.12

| Curvature Radius | Axial Surface Distance | Refractive Index | Abbe Number |
|---|---|---|---|
| r1* 37.719 | | | |
| | d1 1.950 | N1 1.84506 | ν1 23.66 |
| r2* 22.058 | | | |
| | d2 3.400 | | |
| r3 88.706 | | | |
| | d3 2.900 | N2 1.48749 | ν2 70.44 |
| r4 −10.240 | | | |
| | d4 0.920 | | |
| r5 ∞(aperture) | | | |
| | d5 17.317~13.612~10.71 | | |
| r6* −9.639 | | | |
| | d6 0.900 | N3 1.51178 | ν3 69.07 |
| r7* −40.333 | | | |

TABLE 16-continued

Embodiment 12

Aspherical Coefficient r1

$\epsilon$ = 0.10000 × 10
A4 = −0.48194 × 10E-3
A6 = 0.25659 × 10E-5
A8 = −0.77243 × 10E-7
A10 = 0.11717 × 10E-9
A12 = 0.52725 × 10E-10
A14 = −0.26407 × 10E-11 r2

$\epsilon$ = 0.10000 × 10
A4 = −0.39105 × 10E-3
A6 = 0.33311 × 10E-5
A8 = 0.37167 × 10E-7
A10 = −0.48424 × 10E-9
A12 = −0.10505 × 10E-9 r6

$\epsilon$ = 0.10000 × 10
A4 = 0.35183 × 10E-3
A6 = −0.13159 × 10E-4
A8 = 0.63200 × 10E-6
A10 = −0.13491 × 10E-7
A12 = 0.12801 × 10E-9
A14 = −0.41110 × 10E-12 r7

$\epsilon$ = 0.10000 × 10
A4 = 0.13547 × 10E-3
A6 = −0.28511 × 10E-6
A8 = −0.37787 × 10E-8
A10 = −0.70867 × 10E-10
A12 = 0.90548 × 10E-12
A14 = −0.20558 × 10E-14

TABLE 17

Embodiment 13 f = 36.0~45.9~68.5
Fno = 5.40~6.89~10.28

| Curvature Radius | Axial Surface Distance | Refractive Index | Abbe Number |
|---|---|---|---|
| r1* 15.284 | | | |
| | d1 2.531 | N1 1.84666 | ν1 23.82 |
| r2* 10.517 | | | |
| | d2 4.500 | | |
| r3 52.410 | | | |
| | d3 3.410 | N2 1.48749 | ν2 70.44 |
| r4 −10.018 | | | |
| | d4 1.533 | | |
| r5 ∞(aperture) | | | |
| | d5 16.116~12.426~8.000 | | |
| r6* −10.304 | | | |
| | d6 0.800 | N3 1.51178 | ν3 69.07 |
| r7* −54.368 | | | |

Aspherical Coefficient r1

$\epsilon$ = 0.10000 × 10
A4 = −0.34523 × 10E-3
A6 = 0.35969 × 10E-5
A8 = −0.18748 × 10E-6
A10 = 0.41923 × 10E-9
A12 = 0.77293 × 10E-10
A14 = −0.12540 × 10E-11

TABLE 17-continued

Embodiment 13 r2

$\epsilon$ = 0.10000 × 10
A4 = −0.31344 × 10E-3
A6 = 0.34395 × 10E-6
A8 = 0.36539 × 10E-7
A10 = −0.46741 × 10E-9
A12 = −0.10495 × 10E-9 r6

$\epsilon$ = 0.10000 × 10
A4 = 0.42752 × 10E-3
A6 = −0.97585 × 10E-5
A8 = 0.13792 × 10E-6
A10 = 0.76947 × 10E-9
A12 = −0.37263 × 10E-10
A14 = 0.26329 × 10E-12 r7

$\epsilon$ = 0.10000 × 10
A4 = 0.22755 × 10E-3
A6 = −0.37558 × 10E-5
A8 = 0.28305 × 10E-7
A10 = 0.12918 × 10E-9
A12 = −0.33933 × 10E-11
A14 = 0.14544 × 10E-13

TABLE 18

Embodiment 14 f = 36.0~45.9~58.5
Fno = 5.80~6.87~9.12

| Curvature Radius | Axial Surface Distance | Refractive Index | Abbe Number |
|---|---|---|---|
| r1* 28.026 | | | |
| | d1 1.900 | N1 1.62017 | ν1 24.01 |
| r2* 14.868 | | | |
| | d2 3.600 | | |
| r3 74.988 | | | |
| | d3 3.500 | N2 1.48749 | ν2 70.44 |
| r4 −10.070 | | | |
| | d4 1.533 | | |
| r5 ∞(aperture) | | | |
| | d5 17.679~13.934~11.000 | | |
| r6* −10.637 | | | |
| | d6 1.200 | N3 1.49300 | ν3 58.34 |
| r7* −80.645 | | | |

Aspherical Coefficient r1

$\epsilon$ = 0.10000 × 10
A4 = −0.55810 × 10E-3
A6 = 0.27158 × 10E-5
A8 = −0.83236 × 10E-7
A10 = 0.88213 × 10E-10
A12 = 0.52080 × 10E-10
A14 = −0.15429 × 10E-11 r2

$\epsilon$ = 0.10000 × 10
A4 = −0.42544 × 10E-3
A6 = 0.35182 × 10E-5
A8 = 0.38382 × 10E-7
A10 = −0.48088 × 10E-9
A12 = −0.10504 × 10E-9 r6

$\epsilon$ = 0.10000 × 10
A4 = 0.32218 × 10E-3

TABLE 18-continued

Embodiment 14

A6 = −0.11562 × 10E-4  
A8 = 0.49764 × 10E-6  
A10 = −0.11956 × 10E-7  
A12 = 0.14016 × 10E-9  
A14 = −0.61299 × 10E-12  
r7

ε = 0.10000 × 10  
A4 = 0.13693 × 10E-3  
A6 = −0.13115 × 10E-5  
A8 = −0.19093 × 10E-8  
A10 = 0.99314 × 10E-10  
A12 = −0.35176 × 10E-12  
A14 = −0.29031 × 10E-15

TABLE 19

Embodiment 15 f = 36.0~45.9~58.5  
Fno = 5.80~6.87~9.12

| Curvature Radius | Axial Surface Distance | Refractive Index | Abbe Number |
|---|---|---|---|
| r1* 16.867 | | | |
| | d1 1.600 | N1 1.62017 | ν1 24.01 |
| r2* 9.598 | | | |
| | d2 3.200 | | |
| r3 −120.440 | | | |
| | d3 3.410 | N2 1.52510 | ν2 56.38 |
| r4 −7.911 | | | |
| | d4 1.533 | | |
| r5 ∞(aperture) | | | |
| | d5 14.798~11.379~8.700 | | |
| r6* −11.896 | | | |
| | d6 1.000 | N3 1.52510 | ν3 56.38 |
| r7* −130.746 | | | |

Aspherical Coefficient r1

ε = 0.10000 × 10  
A4 = −0.78927 × 10E-3  
A6 = 0.11393 × 10E-5  
A8 = −0.14705 × 10E-6  
A10 = −0.10890 × 10E-9  
A12 = 0.47116 × 10E-10  
A14 = −0.19103 × 10E-10  
r2

ε = 0.10000 × 10  
A4 = −0.55901 × 10E-3  
A6 = 0.45074 × 10E-5  
A8 = 0.41561 × 10E-7  
A10 = −0.47538 × 10E-9  
A12 = −0.10504 × 10E-9  
r6

ε = 0.10000 × 10  
A4 = 0.47710 × 10E-3  
A6 = −0.11552 × 10E-4  
A8 = 0.40407 × 10E-6  
A10 = −0.14217 × 10E-7  
A12 = 0.23489 × 10E-9  
A14 = −0.13333 × 10E-11  
r7

ε = 0.10000 × 10  
A4 = 0.27870 × 10E-3  
A6 = −0.42449 × 10E-5  
A8 = 0.37276 × 10E-9  
A10 = 0.20256 × 10E-9

TABLE 19-continued

Embodiment 15

A12 = 0.16134 × 10E-11  
A14 = −0.17528 × 10E-13

FIGS. 27A to 30I are diagrams showing aberration curves corresponding to the embodiments 12 to 15, respectively. FIGS. 27A to 27C, 28A to 28C, 29A to 29C, and 30A to 30C show aberrations at the wide-angle-end focal length (at the shortest focal length), FIGS. 27D to 27F, 28D to 28F, 29D to 29F, and 30D to 30F show aberrations at the middle focal length, and FIGS. 27G to 27I, 28G to 28I, 29G to 29I, and 30G to 30I show aberrations at the telephoto-end focal length (at the longest focal length). Moreover, solid lines (d) show aberrations with d-lines, and broken lines (SC) show sine conditions. Furthermore, broken lines (DM) and solid lines (DS) show astigmatisms on the meridional image surface and on the sagittal image surface, respectively.

Of the lenses used in these embodiments, the first and third lenses L1 and L3 in the embodiment 14, and the first to third lenses L1 to L3 in the embodiment 15 are plastic lenses.

In Table 20 below are shown the values corresponding to the conditional expressions (12) to (14) in embodiments 12 to 15.

TABLE 20

| | Conditional Expression (12) $N21 < 1.55$ | Conditional Expression (13) $\nu21 > 55$ | Conditional Expression (14) $\Sigma T \times \phi1$ |
|---|---|---|---|
| Embodiment 12 | 1.512 | 69.1 | 0.37 |
| Embodiment 13 | 1.512 | 69.1 | 0.46 |
| Embodiment 14 | 1.493 | 58.3 | 0.41 |
| Embodiment 15 | 1.525 | 56.4 | 0.40 |

What is claimed is:

1. A zoom lens system comprising, from an object side: a first lens unit having a positive refractive power as a whole, said first lens unit comprising, from the object side, a first lens element, a second lens element having a negative refractive power and an object side surface convex to the object side, a third lens element having a positive refractive power, said first lens unit being provided at a most object-side end of the zoom lens system, and a second lens unit having a negative refractive power, wherein, during zooming from a shortest-focal length state to a longest-focal length state, a distance between said first and second lens units is decreased, and, wherein the zoom lens system fulfills the following condition:

$$0.15 < \phi1 \times T23 < 0.25$$

φ1 corresponding to the composite refractive power of the first lens unit, and T23 corresponding to an air gap between the second and the third lens element.

2. The zoom lens system as claimed in claim 1, wherein said first lens element is made of plastic.

3. The zoom lens system as claimed in claim 1, wherein said first lens element has at least one aspherical surface.

4. The zoom lens system as claimed in claim 1, wherein said first lens element has a negative refractive power.

5. The zoom lens system as claimed in claim 1, further comprising, a diaphragm is provided between said first and second lens units.

6. The zoom lens system as claimed in claim 1, wherein said second lens unit has at least one aspherical lens surface.

7. The zoom lens system as claimed in claim 1, wherein said second lens unit has at least one plastic lens element.

8. A zoom lens system comprising, from an object side:

a first lens unit having a positive refractive power as a whole, said first lens unit comprising, from the object side, a first lens element, a second lens element having a negative refractive power and an image side surface concave to the image side, a third lens element having a positive refractive power, said first lens unit being provided at a most object-side end of the zoom lens system, and;

a second lens unit having a negative refractive power, wherein, during zooming from a shortest-focal length state to a longest-focal length state, a distance between said first and second lens units is decreased, and wherein the zoom lens system fulfils the following condition:

$$0.15 < \phi 1 \times T23 < 0.25$$

$\phi 1$ corresponding to the composite refractive power of the first lens unit, and T23 corresponding to an air gap between the second and the third lens element.

9. The zoom lens system as claimed in claim 8, wherein said first lens element is made of plastic.

10. The zoom lens system as claimed in claim 8, wherein said first lens element has at cast one aspherical surface.

11. The zoom lens system as claimed in claim 8, wherein said first lens element has a negative refractive power.

12. The zoom lens system as claimed in claim 8, further comprising, a diaphragm provided between said first and second lens units.

13. The zoom lens system as claimed in claim 8, wherein said second lens unit has at least one aspherical lens surface.

14. The zoom lens system as claimed in claim 8, wherein said second lens unit has at least one plastic lens element.

* * * * *